US007469011B2

(12) United States Patent  (10) Patent No.: US 7,469,011 B2
Lin et al.  (45) Date of Patent: Dec. 23, 2008

(54) ESCAPE MODE CODE RESIZING FOR FIELDS AND SLICES

(75) Inventors: Chih-Lung Lin, Redmond, WA (US); Pohsiang Hsu, Redmond, WA (US); Thomas W. Holcomb, Bothell, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/933,910

(22) Filed: Sep. 2, 2004

(65) Prior Publication Data
US 2005/0053151 A1  Mar. 10, 2005

Related U.S. Application Data

(60) Provisional application No. 60/501,081, filed on Sep. 7, 2003.

(51) Int. Cl.
*H04N 7/26* (2006.01)
*H03M 7/40* (2006.01)
*H03M 7/48* (2006.01)
*H03M 7/42* (2006.01)
*H03M 7/44* (2006.01)

(52) U.S. Cl. ............... 375/240.23; 341/59; 341/65; 341/67; 341/109

(58) Field of Classification Search ........... 375/240.23; 382/244, 245, 246; 341/65, 67, 107, 59
See application file for complete search history.

(56) References Cited

U.S. PATENT DOCUMENTS

| 4,420,771 A | * | 12/1983 | Pirsch ................. 341/56 |
| 4,698,672 A | | 10/1987 | Chen |
| 4,730,348 A | * | 3/1988 | MacCrisken ........... 375/240 |
| 4,792,981 A | | 12/1988 | Cahill et al. |
| 4,813,056 A | | 3/1989 | Fedele |
| 4,901,075 A | | 2/1990 | Vogel |
| 4,968,135 A | | 11/1990 | Wallace et al. |
| 5,043,919 A | | 8/1991 | Callaway et al. |
| 5,089,818 A | | 2/1992 | Mahieux et al. |

(Continued)

FOREIGN PATENT DOCUMENTS

EP  0540350  5/1993

(Continued)

OTHER PUBLICATIONS

Hui, L. et al. "Matsushita Algortihm for Coding of Moving Picture Information", ISO/IEC-JTC1/SC29/WG11, MPEG91/217, Nov. 1991.*

(Continued)

*Primary Examiner*—Mehrdad Dastouri
*Assistant Examiner*—David N Werner
(74) *Attorney, Agent, or Firm*—Klarquist Sparkman, LLP

(57) ABSTRACT

Techniques and tools for escape mode code resizing are described. For example, a video decoder receives encoded information (e.g., runs, levels) for transform coefficients of blocks. For at least some of the encoded information, the decoder decodes in an escape mode for which codes have sizes signaled on a sub-frame basis (e.g., on a per-interlaced field basis in a video frame, or on a per-slice basis in a video frame). A video encoder performs corresponding encoding and signaling.

19 Claims, 16 Drawing Sheets

U.S. PATENT DOCUMENTS

| | | | |
|---|---|---|---|
| 5,109,451 A | 4/1992 | Aono et al. | |
| 5,128,758 A | 7/1992 | Azadegan | |
| 5,146,324 A * | 9/1992 | Miller et al. | 375/240.03 |
| 5,179,442 A | 1/1993 | Azadegan | |
| 5,227,788 A | 7/1993 | Johnston | |
| 5,227,878 A * | 7/1993 | Puri et al. | 375/240.15 |
| 5,266,941 A | 11/1993 | Akeley et al. | |
| 5,270,832 A | 12/1993 | Balkanski et al. | |
| 5,381,144 A * | 1/1995 | Wilson et al. | 341/63 |
| 5,394,170 A | 2/1995 | Akeley et al. | |
| 5,400,075 A | 3/1995 | Savatier | |
| 5,457,495 A | 10/1995 | Hartung | |
| 5,461,421 A | 10/1995 | Moon | |
| 5,467,134 A | 11/1995 | Laney | |
| 5,481,553 A | 1/1996 | Suzuki | |
| 5,493,407 A | 2/1996 | Takahara | |
| 5,504,591 A | 4/1996 | Dujari | |
| 5,508,816 A | 4/1996 | Ueda et al. | |
| 5,533,140 A | 7/1996 | Sirat et al. | |
| 5,535,305 A | 7/1996 | Acero et al. | |
| 5,544,286 A | 8/1996 | Laney | |
| 5,559,557 A | 9/1996 | Kato et al. | |
| 5,568,167 A | 10/1996 | Galbi et al. | |
| 5,574,449 A | 11/1996 | Golin | |
| 5,579,430 A | 11/1996 | Grill et al. | |
| 5,654,706 A | 8/1997 | Jeong et al. | |
| 5,661,755 A | 8/1997 | Van de Kerkhof | |
| 5,717,821 A | 2/1998 | Tsutsui | |
| 5,748,789 A | 5/1998 | Lee et al. | |
| 5,819,215 A | 10/1998 | Dobson et al. | |
| 5,825,830 A | 10/1998 | Kopf | |
| 5,825,979 A | 10/1998 | Tsutsui et al. | |
| 5,828,426 A * | 10/1998 | Yu | 375/240.26 |
| 5,831,559 A * | 11/1998 | Agarwal et al. | 341/106 |
| 5,835,144 A | 11/1998 | Matsumura | |
| 5,883,633 A | 3/1999 | Gill et al. | |
| 5,884,269 A | 3/1999 | Cellier et al. | |
| 5,889,891 A | 3/1999 | Gersho et al. | |
| 5,946,043 A | 8/1999 | Lee et al. | |
| 5,969,650 A | 10/1999 | Wilson | |
| 5,974,184 A | 10/1999 | Eifrig et al. | |
| 5,974,380 A | 10/1999 | Smyth et al. | |
| 5,982,437 A | 11/1999 | Okazaki | |
| 5,990,960 A | 11/1999 | Murakami | |
| 5,991,451 A | 11/1999 | Keith et al. | |
| 5,995,670 A | 11/1999 | Zabinsky | |
| 6,002,439 A | 12/1999 | Murakami | |
| 6,026,195 A | 2/2000 | Eifrig et al. | |
| 6,038,536 A | 3/2000 | Haroun et al. | |
| 6,041,302 A | 3/2000 | Bruekers | |
| 6,049,630 A | 4/2000 | Wang et al. | |
| 6,054,943 A | 4/2000 | Lawrence | |
| 6,078,691 A | 6/2000 | Luttmer | |
| 6,097,759 A | 8/2000 | Murakami | |
| 6,100,825 A | 8/2000 | Sedluk | |
| 6,111,914 A | 8/2000 | Bist | |
| 6,148,109 A | 11/2000 | Boon | |
| 6,154,572 A | 11/2000 | Chaddha | |
| 6,205,256 B1 | 3/2001 | Chaddha | |
| 6,215,910 B1 | 4/2001 | Chaddha | |
| 6,223,162 B1 | 4/2001 | Chen | |
| 6,226,407 B1 | 5/2001 | Zabih et al. | |
| 6,233,017 B1 | 5/2001 | Chaddha | |
| 6,253,165 B1 | 6/2001 | Malvar | |
| 6,259,810 B1 | 7/2001 | Gill et al. | |
| 6,272,175 B1 * | 8/2001 | Sriram et al. | 375/240 |
| 6,292,588 B1 | 9/2001 | Shen | |
| 6,300,888 B1 | 10/2001 | Chen | |
| 6,304,928 B1 | 10/2001 | Mairs et al. | |
| 6,337,881 B1 | 1/2002 | Chaddha | |
| 6,341,165 B1 | 1/2002 | Gbur | |
| 6,345,123 B1 | 2/2002 | Boon | |
| 6,349,152 B1 | 2/2002 | Chaddha | |
| 6,360,019 B1 | 3/2002 | Chaddha | |
| 6,377,930 B1 | 4/2002 | Chen | |
| 6,392,705 B1 | 5/2002 | Chaddha | |
| 6,404,931 B1 | 6/2002 | Chen | |
| 6,420,980 B1 | 7/2002 | Ejima | |
| 6,421,738 B1 | 7/2002 | Ratan et al. | |
| 6,441,755 B1 * | 8/2002 | Dietz et al. | 341/50 |
| 6,477,280 B1 | 11/2002 | Malvar | |
| 6,487,535 B1 | 11/2002 | Smyth et al. | |
| 6,493,385 B1 | 12/2002 | Sekiguchi et al. | |
| 6,542,631 B1 | 4/2003 | Ishikawa | |
| 6,542,863 B1 * | 4/2003 | Surucu | 704/200.1 |
| 6,567,781 B1 | 5/2003 | Lafe | |
| 6,573,915 B1 | 6/2003 | Sivan et al. | |
| 6,580,834 B2 | 6/2003 | Li et al. | |
| 6,608,935 B2 | 8/2003 | Nagumo et al. | |
| 6,636,168 B2 * | 10/2003 | Ohashi et al. | 341/67 |
| 6,646,578 B1 * | 11/2003 | Au | 341/67 |
| 6,650,784 B2 | 11/2003 | Thyagarajan | |
| 6,678,419 B1 | 1/2004 | Malvar | |
| 6,721,700 B1 | 4/2004 | Yin | |
| 6,728,317 B1 | 4/2004 | Demos | |
| 6,766,293 B1 | 7/2004 | Herre | |
| 6,771,777 B1 | 8/2004 | Gbur | |
| 6,795,584 B2 | 9/2004 | Karczewicz et al. | |
| 6,825,847 B1 | 11/2004 | Molnar et al. | |
| 6,934,677 B2 | 8/2005 | Chen et al. | |
| 7,016,547 B1 | 3/2006 | Smirnov | |
| 7,107,212 B2 | 9/2006 | Van Der Vleuten et al. | |
| 7,139,703 B2 | 11/2006 | Acero et al. | |
| 7,165,028 B2 | 1/2007 | Gong | |
| 2002/0009145 A1 | 1/2002 | Natarajan et al. | |
| 2003/0006917 A1* | 1/2003 | Ohashi et al. | 341/67 |
| 2003/0033143 A1 | 2/2003 | Aronowitz | |
| 2003/0115055 A1 | 6/2003 | Gong | |
| 2003/0138150 A1 | 7/2003 | Srinivasan | |
| 2003/0156648 A1 | 8/2003 | Holcomb et al. | |
| 2004/0044521 A1 | 3/2004 | Chen et al. | |
| 2004/0044534 A1 | 3/2004 | Chen et al. | |
| 2004/0049379 A1 | 3/2004 | Thumpudi et al. | |
| 2004/0114810 A1 | 6/2004 | Boliek | |
| 2004/0136457 A1 | 7/2004 | Funnell et al. | |
| 2005/0015249 A1 | 1/2005 | Mehrotra et al. | |
| 2005/0052294 A1 | 3/2005 | Liang et al. | |

FOREIGN PATENT DOCUMENTS

| | | |
|---|---|---|
| EP | 0910927 | 1/1998 |
| EP | 0966793 | 9/1998 |
| EP | 0931386 | 1/1999 |
| EP | 1 142 130 | 4/2003 |
| EP | 1 400 954 | 3/2004 |
| EP | 1 142 129 | 6/2004 |
| GB | 2 372 918 | 9/2002 |
| GB | 2 388 502 | 11/2003 |
| JP | 5-292481 | 11/1993 |
| JP | 06021830 A * | 1/1994 |
| JP | 6-217110 | 8/1994 |
| JP | 7-274171 | 10/1995 |
| JP | 2002 204170 | 7/2002 |
| WO | WO 98/00924 | 1/1998 |

OTHER PUBLICATIONS

ISO 11172-2: Coding of Moving Picture and Associated Audio for Digital Storage Media at up to About 1.5 Mbit/s: Part 2 (Video), MPEG-1.*

ITU-T Recommendation H.262: Generic Coding of Moving Pictures and Associated Audio Information: Video (MPEG-2), Jul. 1995.*

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p×64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

U.S. Appl. No. 60/341,674, filed Dec. 17, 2001, Lee et al.

U.S. Appl. No. 60/488,710, filed Jul. 18, 2003, Srinivasan et al.

Brandenburg, "ASPEC Coding", *AES 10th International Conference*, pp. 81-90 (1991).

De Agostino et al., "Parallel Algorithms for Optimal Compression using Dictionaries with the Prefix Property," in *Proc. Data Compression Conference '92, IEEE Computer Society Press*, pp. 52-62 (1992).

Shamoon et al., "A Rapidly Adaptive Lossless Compression Algorithm for High Fidelity Audio Coding," *IEEE Data Compression Conf. 1994*, pp. 430-439 (Mar. 1994).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 2002) [Downloaded from the World Wide Web on Mar. 16, 2004].

Wien, "Variable Block-Size Transforms for Hybrid Video Coding," Dissertation, 182 pp. (Feb. 2004).

Cui et al., "A novel VLC based on second-run-level coding and dynamic truncation," Proc. SPIE, vol. 6077, pp. 607726-1 to 607726-9 (2006).

Gailly, "comp.compression Frequently Asked Questions (part 1/3)," 64 pp., document marked Sep. 5, 1999 [Downloaded from the World Wide Web on Sep. 5, 2007].

Chung et al., "A Novel Memory-efficient Huffman Decoding Algorithm and its Implementation," Signal Processing 62, pp. 207-213 (1997).

Gibson et al., *Digital Compression for Multimedia*, "Chapter 2: Lossless Source Coding," Morgan Kaufmann Publishers, Inc., San Francisco, pp. 17-61 (1998).

Gill et al., "Creating High-Quality Content with Microsoft Windows Media Encoder 7," 4 pp. (2000) [Downloaded from the World Wide Web on May 1, 2002].

Ishii et al., "Parallel Variable Length Decoding with Inverse Quantization for Software MPEG-2 Decoders," IEEE Signal Processing Systems, pp. 500-509 (1997).

Jeong et al., "Adaptive Huffman Coding of 2-D DCT Coefficients for Image Sequence Compression," *Signal Processing: Image Communication*, vol. 7, 11 pp. (1995).

Joint Video Team (JVT) of ISO/IEC MPEG & ITU-T VCEG, "Draft ITU-T Recommendation and Final Draft International Standard of Joint Video Specification (ITU-T Rec. H.264, ISO/IEC 14496-10 AVC)," 253 pp. (May 2003).

Nelson, *The Data Compression Book*, "Huffman One Better: Arithmetic Coding," Chapter 5, pp. 123-165 (1992).

Sullivan et al., "The H.264/AVC Advanced Video Coding Standard: Overview and Introduction to the Fidelity Range Extensions," 21 pp. (Aug. 2004).

Tu et al., "Context-Based Entropy Coding of Block Transform Coefficients for Image Compression," *IEEE Transactions on Image Processing*, vol. 11, No. 11, pp. 1271-1283 (Nov. 2002).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

Davis, "The AC-3 Multichannel Coder," Dolby Laboratories Inc., Audio Engineering Study, Inc., Oct. 1993.

ISO/IEC 14496-2, "Coding of Audio-Visual Object—Part 2: Visual," Third Edition, pp. 1-727, (Jun. 2004).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Malvar, "Fast Progressive Image Coding without Wavelets", IEEE Data Compression Conference, Snowbird, Utah, 10 pp. (Mar. 2000).

Najafzadeh-Azghandi, "Perceptual Coding of Narrowband Audio Signals," Thesis, 139pp. (Apr. 2000).

* cited by examiner

Software 580 implementing video encoder and/or decoder with escape code resizing on a per-field or per-slice basis

Figure 10A

| ESCMODE VLC | AC escape decoding mode |
|---|---|
| 1 | mode 1 |
| 01 | mode 2 |
| 00 | mode 3 |

Figure 10B

| ESCLVLSZ VLC | Level codeword size |
|---|---|
| 001 | 1 |
| 010 | 2 |
| 011 | 3 |
| 100 | 4 |
| 101 | 5 |
| 110 | 6 |
| 111 | 7 |
| 00000 | 8 |
| 00001 | 9 |
| 00010 | 10 |
| 00011 | 11 |

Figure 10C

| ESCLVLSZ VLC | Level codeword size |
|---|---|
| 1 | 2 |
| 01 | 3 |
| 001 | 4 |
| 0001 | 5 |
| 00001 | 6 |
| 000001 | 7 |
| 000000 | 8 |

Figure 10D

| ESCRUNSZ FLC | Run codeword size |
|---|---|
| 00 | 3 |
| 01 | 4 |
| 10 | 5 |
| 11 | 6 |

Figure 11A

```
decode_symbol(&run, &level, &last_flag) {
    last_flag = 0;
    index = vlc_decode(); ## Use CodeTable to decode VLC codeword (ACCOEF1)
    if (index != EscapeIndex)
    {
        run = RunTable[index];
        level = LevelTable[index];
        sign = get_bits(1);
        if (sign == 1) level = -level;
        if (index >= StartIndexOfLast) last_flag = 1;
    }
    else
    {
        escape_mode = vlc_decode(); ## Use escape mode table to decode ESCMODE syntax element
        if (escape_mode == mode1)
        {
            index = vlc_decode(); ## Use HuffTable to decode VLC codeword (ACCOEF2)
            run = RunTable[index];
            level = LevelTable[index];
            if (index >= StartIndexOfLast) last_flag = 1;
            if (last_flag == 0)
                level = level + NotLastDeltaLevelTable[run];
            else
                level = level + LastDeltaLevelTable[run];
            sign = get_bits(1);
            if (sign == 1) level = -level;
        }
```

Continued from 11A

```
else if (escape_mode == mode2)
{
    index = vlc_decode();  ## Use HuffTable to decode VLC codeword (ACCOEF2)
    run = RunTable[index];
    level = LevelTable[index];
    if (index >= StartIndexOfLast) last_flag = 1;
    if (last_flag == 0)
        run = run + NotLastDeltaRunTable[level] + 1;
    else
        run = run + LastDeltaRunTable[level] + 1;
    sign = get_bits(1);
    if (sign == 1) level =.-level;
}
else if escape_mode == mode3 (fixed-length encoding)
{
    last_flag = get_bits(1);
    if (first_mode3 == 1)
    {
        first_mode3 = 0;
        level_code_size = vlc_decode();  ## Use selected level size table to decode
        run_code_size = 3 + get_bits(2);
    }
    run = get_bits(run_code_size);
    sign = get_bits(1);
    level = get_bits(level_code_size);
    if (sign == 1) level = -level;
}
}
```

Figure 12A — Index / AC Coding Set Correspondences for PQINDEX <= 8

| Luma blocks | | Chroma blocks | |
| --- | --- | --- | --- |
| Index | Table | Index | Table |
| 0 | High Rate Intra | 0 | High Rate Inter |
| 1 | High Motion Intra | 1 | High Motion Inter |
| 2 | Mid Rate Intra | 2 | Mid Rate Inter |

Figure 12B — Index / AC Coding Set Correspondences for PQINDEX > 8

| Luma blocks | | Chroma blocks | |
| --- | --- | --- | --- |
| Index | Table | Index | Table |
| 0 | Low Motion Intra | 0 | Low Motion Inter |
| 1 | High Motion Intra | 1 | High Motion Inter |
| 2 | Mid Rate Intra | 2 | Mid Rate Inter |

Figure 12C — Index / Coding Set Correspondence for PQINDEX <= 8

| | Luma blocks | Chroma blocks |
| --- | --- | --- |
| Index | Table | Table |
| 0 | High Rate Intra | High Rate Inter |
| 1 | High Motion Intra | High Motion Inter |
| 2 | Mid Rate Intra | Mid Rate Inter |

Figure 12D — Index / Coding Set Correspondence for PQINDEX > 8

| | Luma blocks | Chroma blocks |
| --- | --- | --- |
| Index | Table | Table |
| 0 | Low Motion Intra | Low Motion Inter |
| 1 | High Motion Intra | High Motion Inter |
| 2 | Mid Rate Intra | Mid Rate Inter |

Figure 12E   Index / Coding Set Correspondence for PQINDEX <= 8

| Luma and chroma blocks | |
|---|---|
| Index | Table |
| 0 | High Rate Inter |
| 1 | High Motion Inter |
| 2 | Mid Rate Inter |

Figure 12F   Index / Coding Set Correspondence for PQINDEX > 8

| Luma and chroma blocks | |
|---|---|
| Index | Table |
| 0 | Low Motion Inter |
| 1 | High Motion Inter |
| 2 | Mid Rate Inter |

Figure 13

```
array[63] = {0}; ## 63 element array initialized to zero.
curr_position = 0;
do {
      decode_symbol(&run, &level, &last_flag); ## decode the bitstream as
      ## described in Figure 13 to obtain run, level and last_flag values
      ## for coefficients
      array[curr_position + run] = level;
      curr_position = curr_position + run + 1;
} while (last_flag != 1)
```

US 7,469,011 B2

ESCAPE MODE CODE RESIZING FOR FIELDS AND SLICES

RELATED APPLICATION INFORMATION

This application claims the benefit of U.S. Provisional Patent Application No. 60/501,081, filed Sep. 7, 2003, the disclosure of which is hereby incorporated by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Techniques and tools for video coding and decoding are described. For example, on a per-field basis or on a per-slice basis, sizes of escape mode codes are set for levels and/or runs of transform coefficient of blocks.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an 8-bit luminance sample (also called a luma sample, as the terms "luminance" and "luma" are used interchangeably herein) that defines the grayscale component of the pixel and two 8-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for two video fields), or a single interlaced video field from an interlaced video frame. For progressive frames, intra-picture compression techniques compress individual frames (typically called I-frames or key frames), and inter-picture compression techniques compress frames (typically called predicted frames, P-frames, or B-frames) with reference to a preceding and/or following frame (typically called a reference or anchor frame) or frames (for B-frames).

I. Block Coding/Decoding in Windows Media Video, Version 9

Microsoft Corporation's Windows Media Video, Version 9 ["WMV9"] includes a video encoder and a video decoder. The encoder uses intra and inter compression, and the decoder uses intra and inter decompression. The intra and inter compression are block based. The intra compression uses a block-based frequency transform on blocks of samples. The inter compression uses block-based motion compensated prediction coding followed by transform coding of the residual error.

A. Block-based Intra Compression

FIG. 1 illustrates block-based intra compression in the encoder. In particular, FIG. 1 illustrates compression of an 8×8 block (105) of samples of an intra frame by the encoder. The encoder splits the frame into 8×8 blocks of samples and applies an 8×8 frequency transform (110) to individual blocks such as the block (105). The encoder quantizes (120) the transform coefficients (115), resulting in an 8×8 block of quantized transform coefficients (125).

Further encoding varies depending on whether a coefficient is a DC coefficient (the top left coefficient), an AC coefficient in the top row or left column, or another AC coefficient. The encoder typically encodes the DC coefficient (126) as a differential from the DC coefficient (136) of a neighboring 8×8 block, which is a previously encoded and decoded/reconstructed top or left neighbor block. The encoder entropy encodes (140) the differential.

The entropy encoder can encode the left column or top row of AC coefficients as differentials from AC coefficients a corresponding left column or top row of a neighboring 8×8 block. FIG. 1 shows the left column (127) of AC coefficients encoded as differentials (147) from the left column (137) of the neighboring (actually situated to the left) block (135).

The encoder scans (150) the 8×8 block (145) of predicted, quantized AC coefficients into a one-dimensional array (155) and then entropy encodes the scanned coefficients using a variation of run/level coding (160). The encoder selects variable length codes ["VLCs"] from run/level/last tables (165) and outputs the VLCs.

B. Block-based Intra Decompression

FIG. 2 shows an example of corresponding decoding (200) for an intra-coded block by the decoder. In particular, FIG. 2 illustrates decompression of an 8×8 block of samples of an intra frame by the decoder to produce a reconstructed version (205) of the original 8×8 block (105).

The decoder receives and decodes (270) VLCs with run/level/last tables (265). The decoder run/level decodes (260) AC coefficients and puts the results into a one-dimensional array (255), from which the AC coefficients are inverse zigzag scanned (250) into a two-dimensional block (245).

The AC coefficients of the left column or top row of the block (245) may be differentials, in which case the decoder combines them with corresponding AC coefficients from a neighboring 8×8 block. In FIG. 2, the left column (247) of AC coefficients are differentials, and they are combined with AC coefficients of the left column (237) of a neighboring (actually situated to the left) block (235) to produce a left column (227) of AC coefficients in a block (225) of quantized transform coefficients.

To decode the DC coefficient (226), the decoder decodes (240) a DC differential. The decoder combines the DC differential with a DC coefficient (236) of a neighboring 8×8 block to produce the DC coefficient (226) of the block (225) of quantized transform coefficients.

The decoder inverse quantizes (220) the quantized transform coefficients of the block (225), resulting in a block (215) of transform coefficients. The decoder applies an inverse frequency transform (210) to the block (215) of transform coefficients, producing the reconstructed version (205) of the original 8×8 block (105).

C. Escape Mode Coding and Decoding for Intra-coded Blocks

When the encoder selects and outputs a VLC for a given run/level/last triplet from a run/level/last table (165), the VLC may be an escape code. If so, one or more additional codes follow in the bitstream to provide information about the triplet. There are three alternative escape modes.

In the first escape mode, an additional VLC in the bitstream represents the run/level/last triplet. A level value derived from the additional VLC represents an initial level value. A run value derived from the additional VLC represents a run, but is also used as an index in a table to determine an extra amount to be added to the initial level value.

Similarly, in the second escape mode, an additional VLC in the bitstream represents the run/level/last triplet. A run value derived from the additional VLC represents an initial run value. A level value derived from the additional VLC represents a level, but is also used as an index in a table to determine an extra amount to be added to the initial run value.

In the third escape mode, the last value is signaled as a single bit. For the first use of the third escape mode in the current frame, the encoder signals (with a fixed length code ["FLC"]) a size value for third mode-coded run values and signals (with a VLC) another size value for third mode-coded level values for the current frame. The size elements are followed by a run code (having the signaled run code size) and a level code (having the signaled level code size). A sign value for the level is also signaled with one bit. For subsequent uses of the third escape mode in the current frame, the previously signaled size values for the current frame apply, and new size values are not signaled. Instead, a run code (having the previously signaled run code size), sign bit, and level code (having the previously signaled level code size) are signaled.

When the decoder receives and decodes (270) VLCs with run/level/last tables (265), some VLCs are directly represented with run/level/last triplets in the tables (265). Other VLCs are not, and the decoder as necessary performs the reverse of the escape mode coding to decode the AC coefficients.

The resizing of codes for runs and levels in the third escape mode provides adaptivity to patterns of run and levels in a given frame. For example, when there are no long runs, shorter codes for escape-coded runs may be used. And when there are no high levels, shorter codes for escape-coded levels may be used. In some scenarios, however, adaptivity at frame level is inadequate. For example, suppose a scene transition occurs between two fields of a single interlaced video frame, and that one field of the frame has long runs and small levels of coefficients, while the other field of the frame has short runs and high levels of coefficients. Setting escape code sizes for the whole frame can lead to inefficiencies in the coding of the small levels and short runs. Or, suppose a single progressive frame includes multiple, very different types of content, such as a main area of dynamic video, a static border area, and a scrolling text display. Setting escape code sizes for the whole frame can again lead to inefficiencies in escape coding certain areas of the frame.

D. Block-based Inter Compression

FIG. 3 illustrates the block-based inter compression for a predicted frame in the encoder. In particular, FIG. 3 illustrates compression of a prediction residual block (335) for a motion-compensated predicted block of a predicted frame in the encoder. The error block (335) is the difference between the predicted block (315) and the original current block (325). The encoder applies a frequency transform (340) to the error block (335), resulting in an 8×8 block (345) of transform coefficients. The encoder then quantizes (350) the transform coefficients, resulting in an 8×8 block of quantized transform coefficients (355). The encoder scans (360) the 8×8 block (355) into a one-dimensional array (365). The encoder entropy encodes the scanned DC and AC coefficients using a variation of run length coding (370). The encoder selects VLCs from a run/level/last table (375) and outputs the VLCs.

E. Block-based Inter Decompression

FIG. 4 shows an example of corresponding decoding (400) for an inter-coded block. In summary of FIG. 4, a decoder decodes (410, 420) entropy-coded information representing a prediction residual using variable length decoding (410) with a run/level/last table (415) and run length decoding (420). The decoder inverse scans (430) a one-dimensional array (425) storing the entropy-decoded information into a two-dimensional block (435). The decoder inverse quantizes and inverse frequency transforms (together, 440) the data, resulting in a reconstructed error block (445). In a separate motion compensation path, the decoder computes a predicted block (465) using motion vector information (455) for displacement from a reference frame. The decoder combines (470) the predicted block (465) with the reconstructed error block (445) to form the reconstructed block (475).

F. Escape Mode Coding and Decoding for Inter-coded Blocks

For an inter-coded block, when the encoder selects and outputs a VLC for a given run/level/last triplet from a run/level/last table (375), the VLC may be an escape code. If so, one or more additional codes follow in the bitstream to provide information about the triplet. There are three alternative escape modes, which generally correspond to the three escape modes described above for intra-coded blocks.

Similarly, when the decoder receives and decodes (410) VLCs with a run/level/last table (415), some VLCs are directly represented with run/level/last triplets in the table (415). Other VLCs are not, and the decoder as necessary performs the reverse of the escape mode coding to decode the DC and AC coefficients.

II. Standards for Video Compression and Decompression

Aside from previous WMV encoders and decoders, several international standards relate to video compression and decompression. These standards include the Motion Picture Experts Group ["MPEG"] 1, 2, and 4 standards and the H.261, H.262 (another name for MPEG 2), H.263, and H.264 standards from the International Telecommunication Union ["ITU"].

An encoder and decoder complying with one of these standards typically use some variation of run/level coding/decoding. To the extent escape mode coding/decoding is used for runs and levels, the sizes of the codes following the escape VLC are static in most cases. In other words, one size is defined for all time for escape-coded runs, and another size is defined for all time for escape-coded levels. Where code size variation is possible, the different sizes are for different ranges of level values in a single VLC-like code table (MPEG-1, Table B.5f, section D.6.3.5.), or the different sizes are for compatibility purposes with other standards (MPEG-4, section 6.3.4, 7.3.1.3). There is no resizing of escape mode codes for runs and levels so as to adapt to different patterns of run and levels.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for setting sizes of escape mode codes. The described techniques and tools include, but are not limited to, the following:

A tool such as a video decoder receives encoded information for transform coefficients of blocks and decodes the encoded information. In doing so, the decoder decodes at least some of the encoded information in an escape mode for which codes have sizes that are signaled on a sub-frame basis (e.g., per-field basis and/or per-slice basis). For example, the information includes runs and/or levels, and the signaled sizes include run code sizes and/or level code sizes.

Or, a tool such as a video encoder determines information for transform coefficients of blocks and encodes the information. In doing so, the encoder encodes at least some of the information in an escape mode for which codes have sizes that are signaled on a sub-frame basis.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIGS. 10A-10D are tables for codes used in an escape mode.

FIGS. 11A and 11B are pseudocode for decoding a run/level/last triplet.

FIG. 12A-12F are charts showing code table selection options for coefficient decoding.

FIG. 13 is pseudocode for decoding coefficients for a block.

DETAILED DESCRIPTION

The present application relates to techniques and tools for efficient compression and decompression of video, along with corresponding signaling techniques. In particular, the present application relates to resizing of escape mode codes on a sub-frame basis. For example, escape mode codes for runs and/or levels of transform coefficients are resized for each new interlaced video field or for each new slice in a frame.

I. Computing Environment

Figure 1:
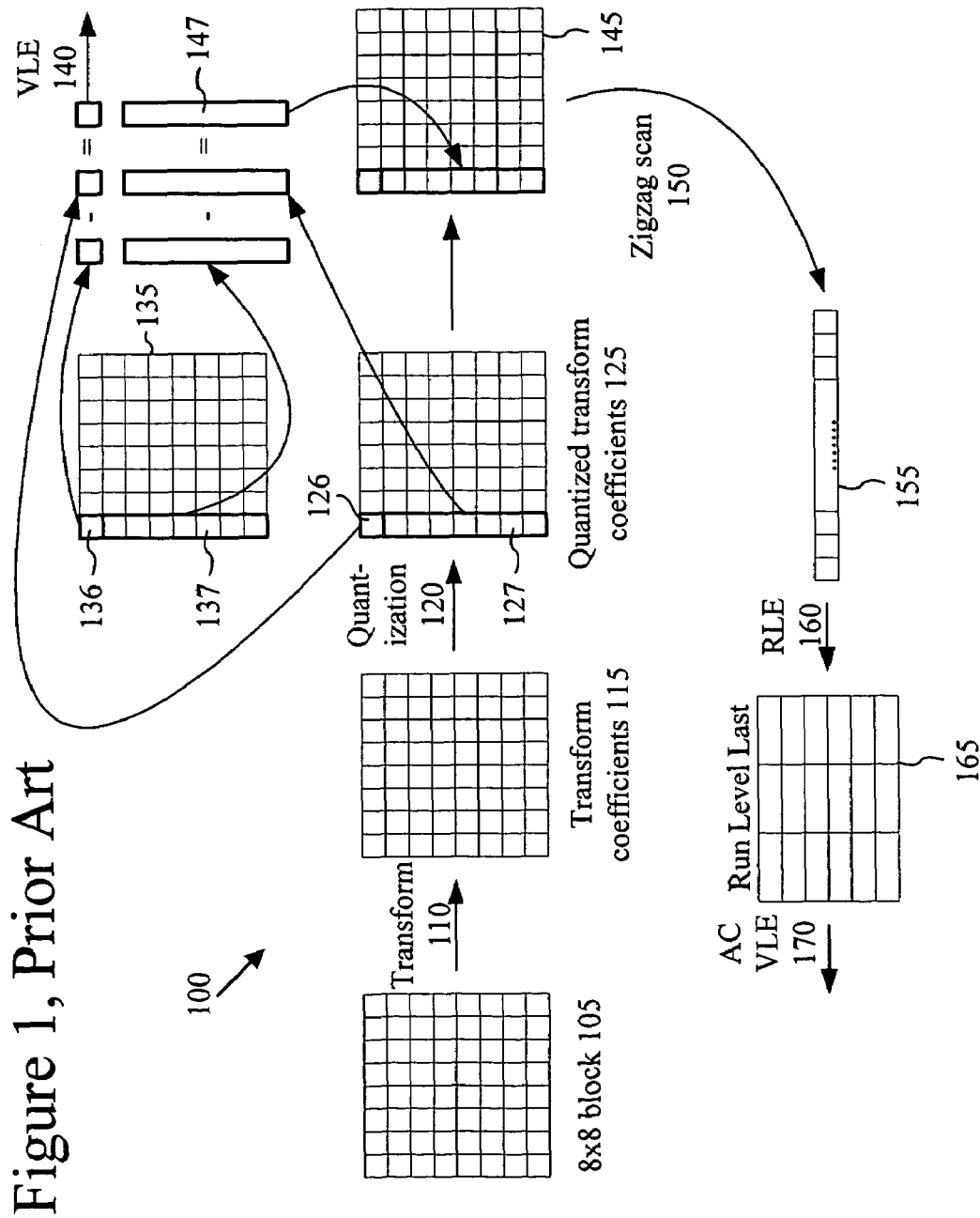
FIG. 1 is a diagram showing block-based intra compression for an 8×8 block of samples in a video encoder according to the prior art.
Figure 2:
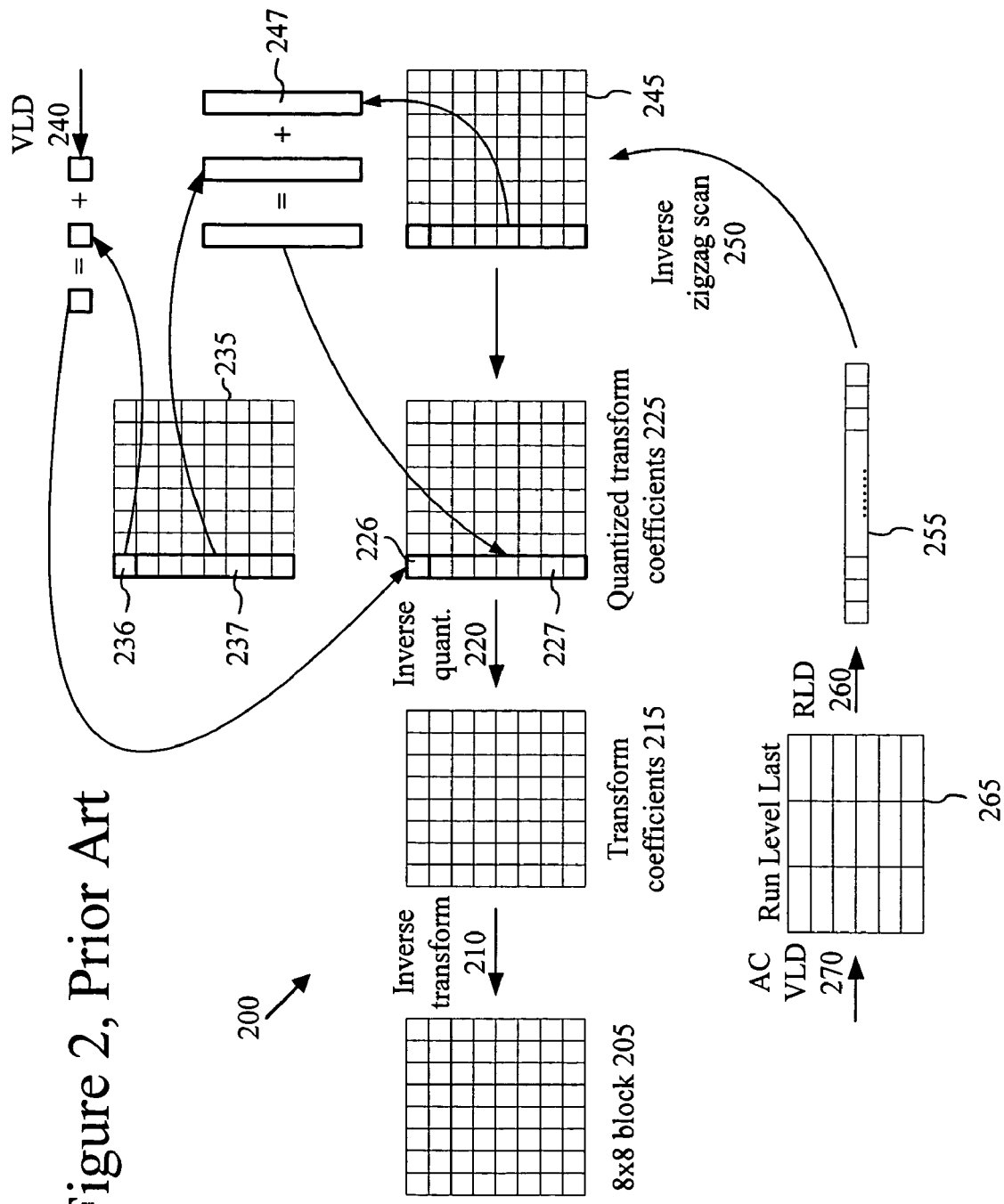
FIG. 2 is a diagram showing block-based intra decompression for an 8×8 block of samples in a video encoder according to the prior art.
Figure 3:
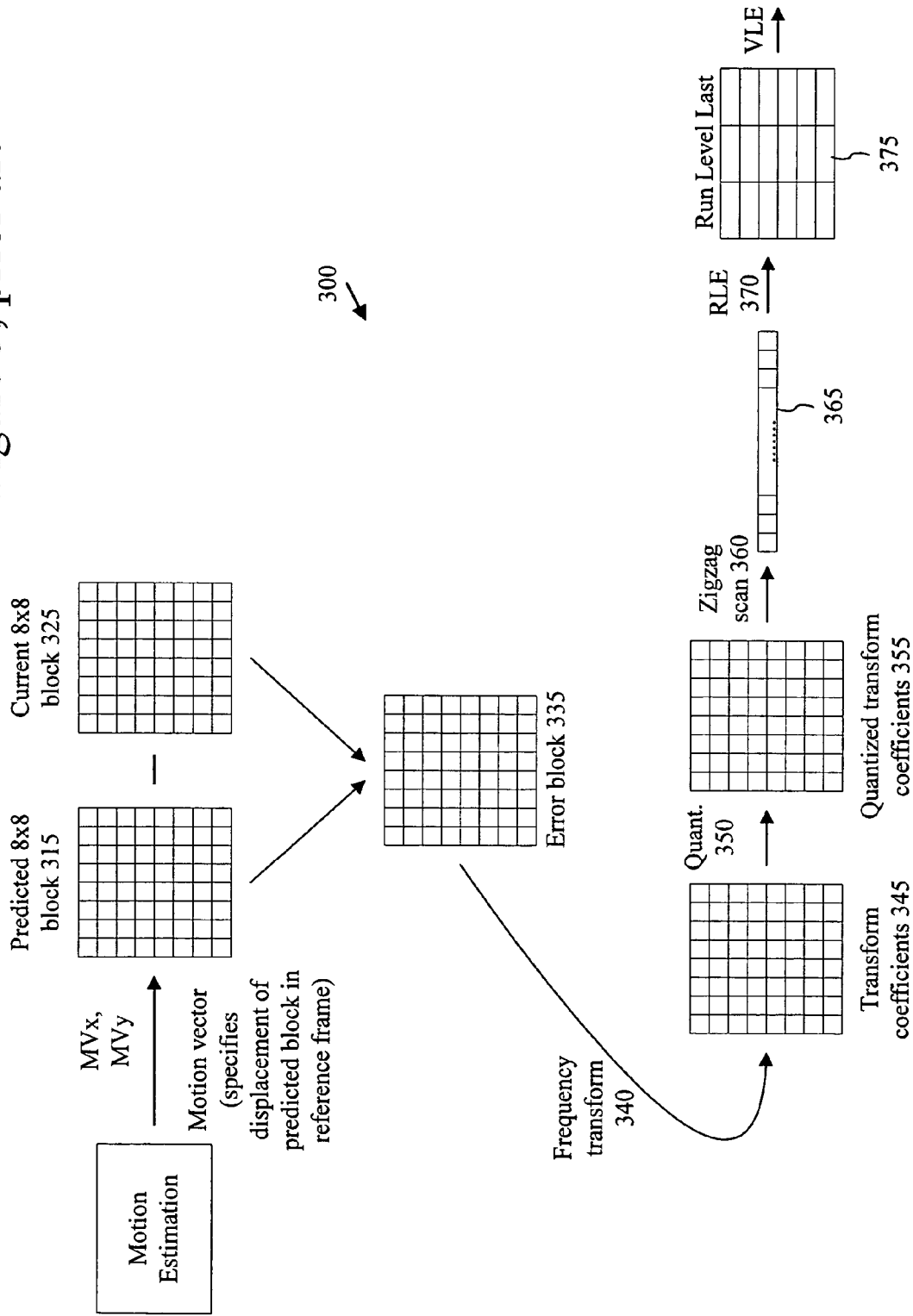
FIG. 3 is a diagram showing block-based compression for an 8×8 block of prediction residuals in a video encoder according to the prior art.
Figure 4:
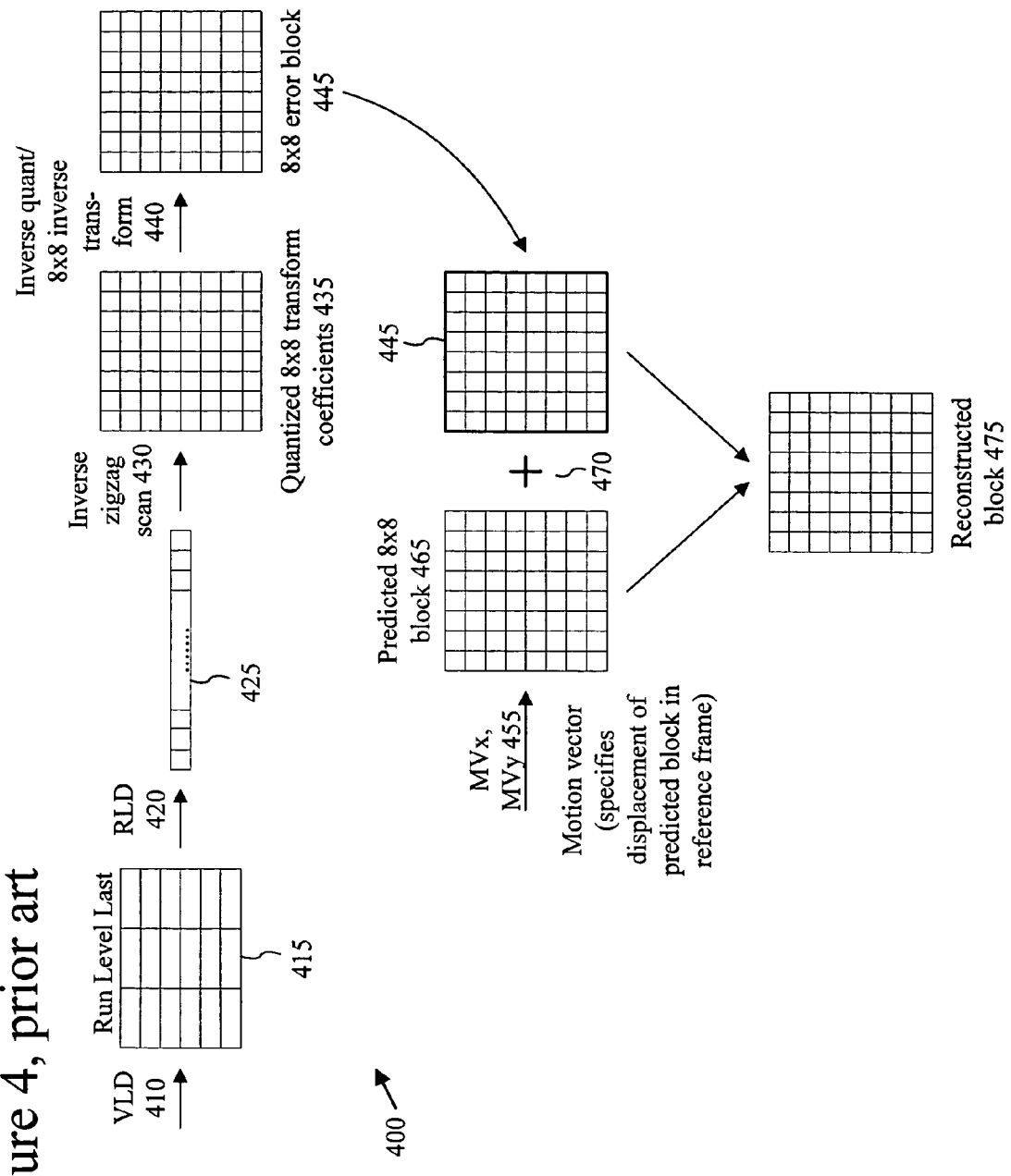
FIG. 4 is a diagram showing block-based decompression for an 8×8 block of prediction residuals in a video decoder according to the prior art.
Figure 5:
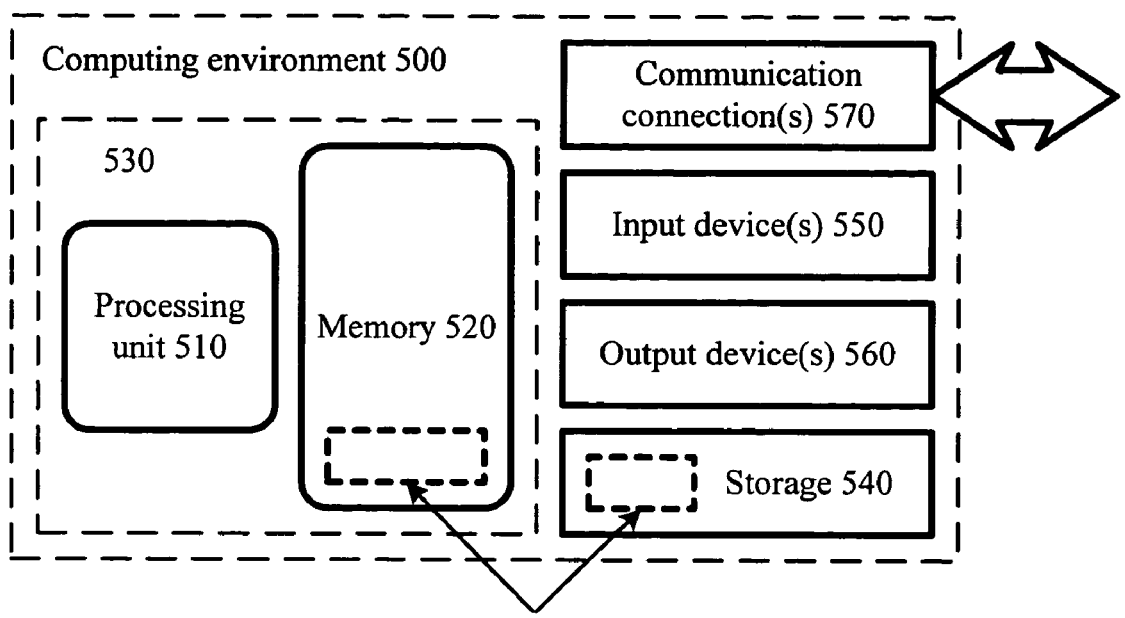
FIG. 5 is a block diagram of a suitable computing environment in conjunction with which several described embodiments may be implemented.

FIG. 5 illustrates a generalized example of a suitable computing environment (500) in which several of the described embodiments may be implemented. The computing environment (500) is not intended to suggest any limitation as to scope of use or functionality, as the techniques and tools may be implemented in diverse general-purpose or special-purpose computing environments.

With reference to FIG. 5, the computing environment (500) includes at least one processing unit (510) and memory (520). In FIG. 5, this most basic configuration (530) is included within a dashed line. The processing unit (510) executes computer-executable instructions and may be a real or a virtual processor. In a multi-processing system, multiple processing units execute computer-executable instructions to increase processing power. The memory (520) may be volatile memory (e.g., registers, cache, RAM), non-volatile memory (e.g., ROM, EEPROM, flash memory, etc.), or some combination of the two. The memory (520) stores software (580) implementing a video encoder or decoder with escape code resizing on a per-field or per-slice basis.

A computing environment may have additional features. For example, the computing environment (500) includes storage (540), one or more input devices (550), one or more output devices (560), and one or more communication connections (570). An interconnection mechanism (not shown) such as a bus, controller, or network interconnects the components of the computing environment (500). Typically, operating system software (not shown) provides an operating environment for other software executing in the computing environment (500), and coordinates activities of the components of the computing environment (500).

The storage (540) may be removable or non-removable, and includes magnetic disks, magnetic tapes or cassettes, CD-ROMs, DVDs, or any other medium which can be used to store information and which can be accessed within the computing environment (500). The storage (540) stores instructions for the software (580) implementing the video encoder or decoder.

The input device(s) (550) may be a touch input device such as a keyboard, mouse, pen, or trackball, a voice input device, a scanning device, or another device that provides input to the computing environment (500). For audio or video encoding, the input device(s) (550) may be a sound card, video card, TV tuner card, or similar device that accepts audio or video input in analog or digital form, or a CD-ROM or CD-RW that reads audio or video samples into the computing environment (500). The output device(s) (560) may be a display, printer, speaker, CD-writer, or another device that provides output from the computing environment (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (500), computer-readable media include memory (520), storage (540), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "receive," "signal," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 6:
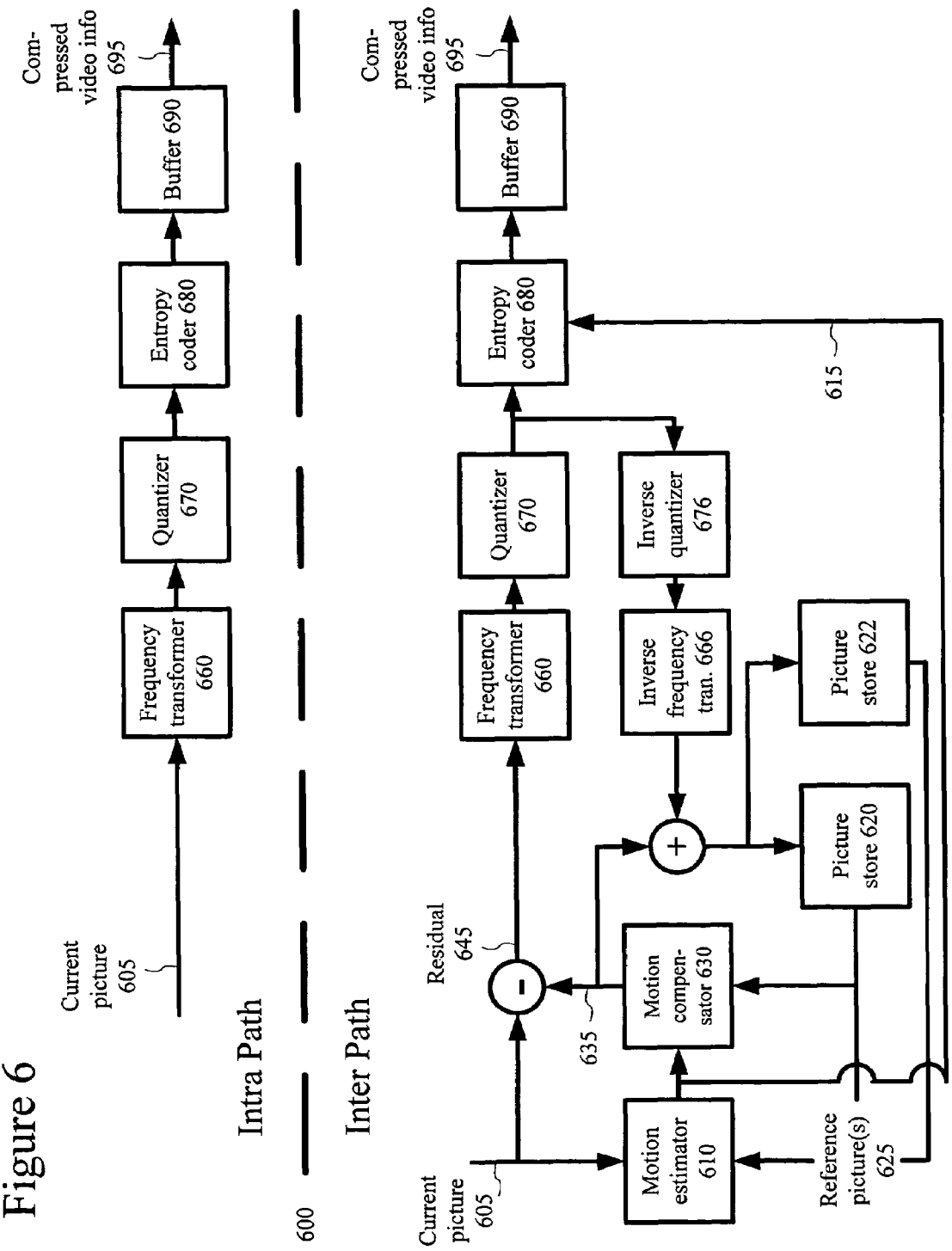
FIG. 6 is a block diagram of a generalized video encoder system in conjunction with which several described embodiments may be implemented.
Figure 7:
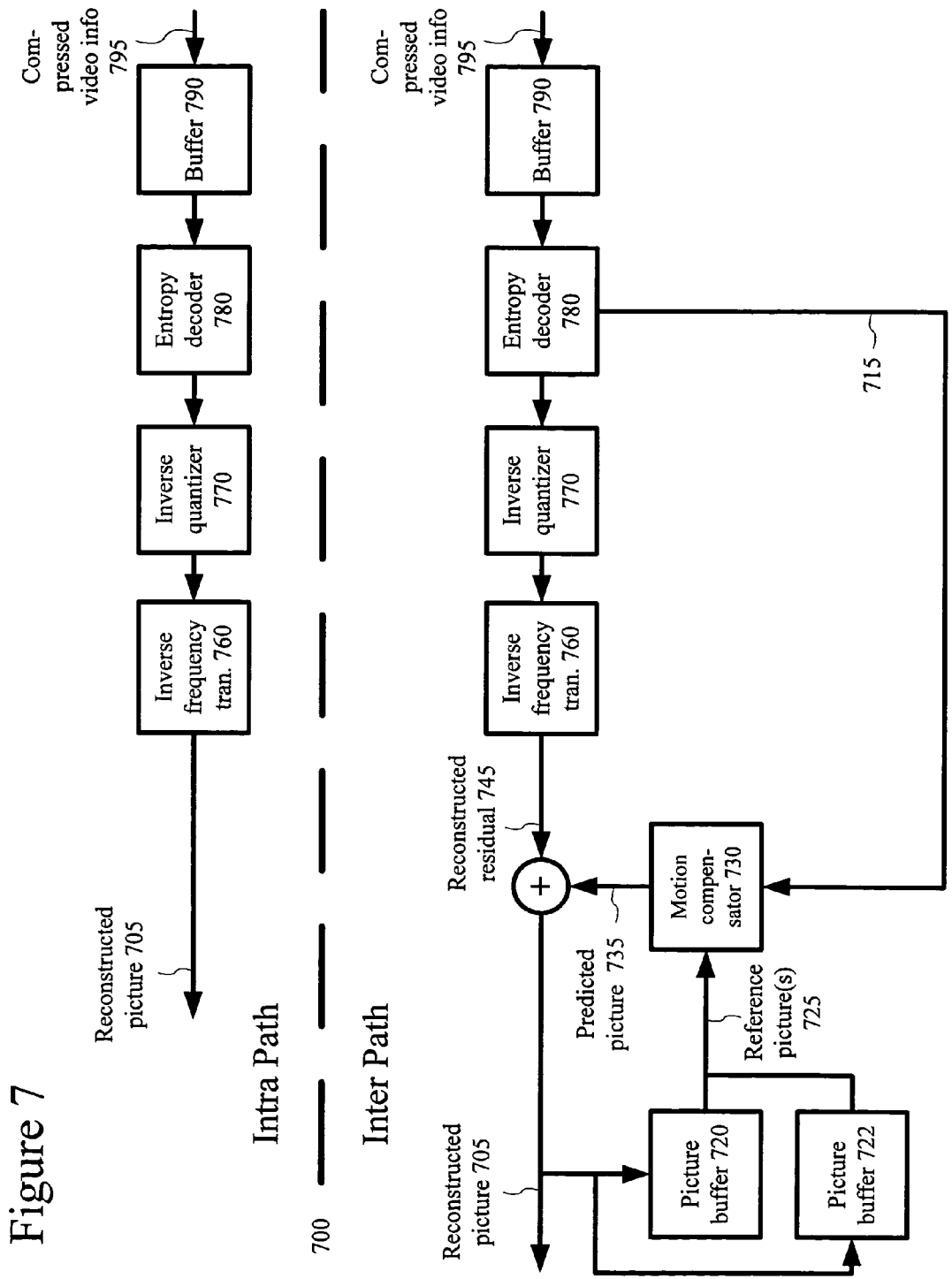
FIG. 7 is a block diagram of a generalized video decoder system in conjunction with which several described embodiments may be implemented.

FIG. 6 is a block diagram of a generalized video encoder system (600), and FIG. 7 is a block diagram of a video decoder system (700), in conjunction with which various described embodiments may be implemented.

The relationships shown between modules within the encoder and decoder indicate the main flow of information in the encoder and decoder; other relationships are not shown for the sake of simplicity. In particular, FIGS. 6 and 7 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9, VC-9, or other format.

The encoder (600) and decoder (700) process video pictures, which may be video frames, video fields or combinations of frames and fields. The bitstream syntax and semantics at the picture and macroblock levels may depend on whether progressive frames, interlaced frames, or separate fields of interlaced frames are used in coding and decoding. For progressive video, the lines of a video frame contain samples starting from one time instant and continuing through successive lines to the bottom of the frame. A progressive I-frame is an intra-coded progressive video frame. A progressive P-frame is a progressive video frame coded using forward motion-compensated prediction, and a progressive B-frame is a progressive video frame coded using bi-directional motion-compensated prediction.

An interlaced video frame consists of two scans of a frame—one for the even lines of the frame (the top field) and the other for the odd lines of the frame (the bottom field). The two fields may represent two different time periods or they may be from the same time period. For encoding and decoding, an interlaced video frame may be organized as one frame (frame coding) or as two separate fields (field coding). In general, frame coding is more efficient for stationary regions in the frame. For frame coding, an interlaced video frame is partitioned into macroblocks, where a particular macroblock includes lines from both of the interlaced fields. An interlaced video frame may be coded as an interlaced I-frame, interlaced P-frame, or interlaced B-frame.

In general, field coding is more efficient for moving regions of an interlaced video frame, because the two fields may have different motion. For field coding, an individual field is partitioned into macroblocks, where a particular macroblock includes lines from only that field (either top or bottom). A given interlaced field may be coded as an interlaced I-field, interlaced P-field, or interlaced B-field.

The term picture generally refers to source, coded or reconstructed image data. For progressive video, a picture is a progressive video frame. For interlaced video, a picture may refer to an interlaced video frame, the top field of the frame, or the bottom field of the frame, depending on the context. An I-picture typically includes intra-coded blocks but not inter-coded blocks. A P-picture or B-picture typically includes inter-coded blocks but may also include intra-coded blocks.

The encoder (600) and decoder (700) are block-based and use a 4:2:0 macroblock format, with each macroblock including four 8×8 luminance blocks (at times treated as one 16×16 macroblock) and two 8×8 chrominance blocks that are co-located with the four luminance blocks but half resolution horizontally and vertically. For fields, the same or a different macroblock organization and format may be used. 8×8 blocks may be further sub-divided at different stages, e.g., at the frequency transform (e.g., 8×4, 4×8 or 4×4 DCTs) and entropy encoding stages.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques. Alternatively, the encoder (600) and decoder (700) are object-based, use a different macroblock or block format, or perform operations on sets of pixels of different size or configuration than 8×8 blocks and 16×16 macroblocks.

A. Video Encoder

FIG. 6 is a block diagram of a generalized video encoder system (600). The encoder system (600) receives a sequence of video pictures including a current picture (605) (e.g., progressive video frame, interlaced video frame, or field of an interlaced video frame), and produces compressed video information (695) as output. Particular embodiments of video encoders typically use a variation or supplemented version of the generalized encoder (600).

The encoder system (600) compresses predicted pictures and key pictures. For the sake of presentation, FIG. 6 shows a path for key pictures through the encoder system (600) and a path for forward-predicted pictures. Many of the components of the encoder system (600) are used for compressing both key pictures and predicted pictures. The exact operations performed by those components can vary depending on the type of information being compressed.

A predicted picture (also called p-picture) is represented in terms of prediction (or difference) from one or more other pictures. A prediction residual is the difference between what was predicted and the original picture. In contrast, a key picture (also called an I-picture) is compressed without reference to other pictures.

If the current picture (605) is a forward-predicted picture, a motion estimator (610) estimates motion of macroblocks or other sets of pixels of the current picture (605) with respect to a reference picture, which is a reconstructed previous picture (625) buffered in the picture store (620). In alternative embodiments, the reference picture is a later picture or the current picture is bi-directionally predicted. The motion estimator (610) can estimate motion by pixel, ½ pixel, ¼ pixel, or other increments, and can switch the precision of the motion estimation on a picture-by-picture basis or other basis. The precision of the motion estimation can be the same or different horizontally and vertically. The motion estimator (610) outputs as side information motion information (615) such as motion vectors. A motion compensator (630) applies the motion information (615) to the reconstructed previous picture (625) to form a motion-compensated current picture (635). The prediction is rarely perfect, however, and the difference between the motion-compensated current picture (635) and the original current picture (605) is the prediction residual (645). Alternatively, a motion estimator and motion compensator apply another type of motion estimation/compensation.

A frequency transformer (660) converts the spatial domain video information into frequency domain (i.e., spectral) data. For block-based video pictures, the frequency transformer (660) applies a DCT or variant of DCT to blocks of the pixel data or prediction residual data, producing blocks of DCT coefficients. Alternatively, the frequency transformer (660) applies another conventional frequency transform such as a Fourier transform or uses wavelet or subband analysis. The frequency transformer (660) applies an 8×8, 8×4, 4×8, 4×4 or other size frequency transforms to prediction residuals for predicted pictures.

A quantizer (670) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (600) can use frame dropping, adaptive filtering, or other techniques for rate control.

When a reconstructed current picture is needed for subsequent motion estimation/compensation, an inverse quantizer (676) performs inverse quantization on the quantized spectral data coefficients. An inverse frequency transformer (666) then performs the inverse of the operations of the frequency transformer (660), producing a reconstructed prediction residual (for a predicted picture) or reconstructed samples (for an intra-coded picture). If the picture (605) being encoded is an intra-coded picture, then the reconstructed samples form the reconstructed current picture (not shown). If the picture (605) being encoded is a predicted picture, the reconstructed prediction residual is added to the motion-compensated predictions (635) to form the reconstructed current picture. The picture store (620) buffers the reconstructed current picture for use in predicting a next picture. In some embodiments, the encoder applies a deblocking filter to the reconstructed frame to adaptively smooth discontinuities between the blocks of the frame.

The entropy coder (680) compresses the output of the quantizer (670) as well as certain side information (e.g., motion information (615), quantization step size). Typical entropy coding techniques include arithmetic coding, differential coding, Huffman coding, run length coding, LZ coding, dictionary coding, and combinations of the above. The entropy coder (680) typically uses different coding techniques for different kinds of information (e.g., DC coefficients, AC coefficients, different kinds of side information), and can choose from among multiple code tables within a particular coding technique.

The entropy coder (680) puts compressed video information (695) in the buffer (690). A buffer level indicator is fed back to bit rate adaptive modules. The compressed video information (695) is depleted from the buffer (690) at a constant or relatively constant bit rate and stored for subsequent streaming at that bit rate. Therefore, the level of the buffer (690) is primarily a function of the entropy of the filtered, quantized video information, which affects the efficiency of the entropy coding. Alternatively, the encoder system (600) streams compressed video information immediately following compression, and the level of the buffer (690) also depends on the rate at which information is depleted from the buffer (690) for transmission.

Before or after the buffer (690), the compressed video information (695) can be channel coded for transmission over the network. The channel coding can apply error detection and correction data to the compressed video information (695).

B. Video Decoder

FIG. 7 is a block diagram of a general video decoder system (700). The decoder system (700) receives information (795) for a compressed sequence of video pictures and produces output including a reconstructed picture (705) (e.g., progressive video frame, interlaced video frame, or field of an interlaced video frame). Particular embodiments of video decoders typically use a variation or supplemented version of the generalized decoder (700).

The decoder system (700) decompresses predicted pictures and key pictures. For the sake of presentation, FIG. 7 shows a path for key pictures through the decoder system (700) and a path for forward-predicted pictures. Many of the components of the decoder system (700) are used for decompressing both key pictures and predicted pictures. The exact operations performed by those components can vary depending on the type of information being decompressed.

A buffer (790) receives the information (795) for the compressed video sequence and makes the received information available to the entropy decoder (780). The buffer (790) typically receives the information at a rate that is fairly constant over time, and includes a jitter buffer to smooth short-term variations in bandwidth or transmission. The buffer (790) can include a playback buffer and other buffers as well. Alternatively, the buffer (790) receives information at a varying rate. Before or after the buffer (790), the compressed video information can be channel decoded and processed for error detection and correction.

The entropy decoder (780) entropy decodes entropy-coded quantized data as well as entropy-coded side information (e.g., motion information (715), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (780) frequently uses different decoding techniques for different kinds of information (e.g., DC coefficients, AC coefficients, different kinds of side information), and can choose from among multiple code tables within a particular decoding technique.

If the picture (705) to be reconstructed is a forward-predicted picture, a motion compensator (730) applies motion information (715) to a reference picture (725) to form a prediction (735) of the picture (705) being reconstructed. For example, the motion compensator (730) uses a macroblock motion vector to find a macroblock in the reference picture (725). A picture buffer (720) stores previous reconstructed pictures for use as reference pictures. The motion compensator (730) can compensate for motion at pixel, ½ pixel, ¼ pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (700) also reconstructs prediction residuals.

When the decoder needs a reconstructed picture for subsequent motion compensation, the picture store (720) buffers the reconstructed picture for use in predicting a next picture. In some embodiments, the encoder applies a deblocking filter to the reconstructed frame to adaptively smooth discontinuities between the blocks of the frame.

An inverse quantizer (770) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (760) converts the quantized, frequency domain data into spatial domain video information. For block-based video pictures, the inverse frequency transformer (760) applies an IDCT or variant of IDCT to blocks of the DCT coefficients, producing pixel data or prediction residual data for key pictures or predicted pictures, respectively. Alternatively, the frequency transformer (760) applies another conventional inverse frequency transform such as a Fourier transform or uses wavelet or subband synthesis. The inverse frequency transformer (760) applies an 8×8, 8×4, 4×8, 4×4 or other size inverse frequency transforms to prediction residuals for predicted pictures.

III. Escape Mode Code Length Resizing

In some embodiments, an encoder and decoder resize the codes used in an escape mode for runs and levels of transform coefficients. For example, the encoder and decoder resize the escape mode codes for different fields in an interlaced video frame so as to adapt the escape mode code sizes to the run and level values possible in the different fields. Or, the encoder and decoder resize the escape mode codes for different slices in a frame or field so as to adapt the sizes to the run and level values possible in the different slices. In this way, runs and levels signaled in the escape mode can consume fewer bits overall. Moreover, resizing facilitates independent access to a second field or second, third, etc. slice in a frame, bypassing the first.

A. Theory

When transform coefficients are encoded with 3D variable length coding (i.e., run/level/last encoding), to limit the size of a 3D VLC table, many run/level/last events are not directly covered in the table. For example, less common run/level/last events that have a long run and/or a high level may not be included in the table. Instead, such an event is signaled with an escape codeword followed by a series of escape mode codes. The escape mode codes may be considered FLCs—the sizes of the escape mode codes are set before the escape mode codes are received. Unlike some conventional FLCs, however, the escape mode codes may be resized.

In conventional escape mode coding/decoding, escape mode codes have static sizes. This is inefficient if many of the values in the code range are not used. For example, suppose a level value is signaled with 12 bits in an escape mode. The 12 bits allow signaling of $2^{12}$=4096 different values. If a given frame (or field, or slice) has numerous escape mode-coded level values but none higher than 35, using 12 bits per level value is likely inefficient. Or, suppose a run value is signaled with 6 bits in the escape mode. If a given frame (or field, or slice) has numerous escape mode-coded run values but none higher than 7, using 6 bits per run value is likely inefficient.

For this reason, in some embodiments, an encoder and decoder resize escape mode codes for a field and/or a slice. The resizing may be used, for example, for run codes and/or level codes. Compared to just resizing within a frame, resizing escape mode codes within a field and/or slice provides better adaptivity to patterns in the field and/or slice, at the cost of additional signaling overhead for the code sizes when the escape mode is used. When the escape mode is not used, the code sizes need not be signaled.

For level codes in the escape mode, the code size of the level values within an entire field (or entire slice) is specified by a level code size element for the field (or slice). In some implementations below, the level code size element is ESCLVLSZ.

The level code size element is present if the escape mode is being used for the first time within the current field (or slice), but is not signaled for subsequent uses of the escape mode within the same field (or slice).

Similarly, for run codes in the escape mode, the code size of the run values within an entire field (or entire slice) is specified by a run code size element for the field (or slice). In some implementations below, the run code size element is ESCRUNSZ. The run code size element is present if the escape mode is being used for the first time within the current field (or slice), but is not signaled for subsequent uses of the escape mode within the same field (or slice).

Thus, for example, the encoder may look ahead at the run values and level values used for transform coefficients in a particular field or slice. Escape mode code resizing allows the encoder to escape code run values and level values with the smallest escape mode codes possible for the particular field or slice.

Multiple different VLC tables may be used to signal the level code size element and/or run code size element. In addition, the coding/decoding of code size elements may depend on causal information. Alternatively, a single VLC table or FLC table is used for the code size elements, with or without reference to causal information.

Some of the description herein relates to specific syntax elements (such as ESCLVLSZ and ESCRUNSZ) from example implementations. These are examples only, and the techniques and tools described herein may instead be used with other and/or additional syntax elements.

Much of the description herein relates to resizing escape mode codes on a per-field basis and/or per-slice basis. Alternatively, escape mode codes are resized on some other sub-frame basis, for example, for an arbitrary collection of macroblocks in a frame or field, or for a video object in a frame or field, or for an otherwise partitioned area of a frame or field.

In some implementations, there are multiple available escape modes. One escape mode uses resizing of escape mode codes, and other escape modes use different mechanisms. Alternatively, the escape mode with resizing of escape mode codes is the only escape mode.

Finally, although much of the description herein relates specifically to runs and levels for transform coefficients, alternatively, the techniques and tools are applied to other forms of video information or other information.

B. Encoding and Signaling Techniques

Figure 8A:
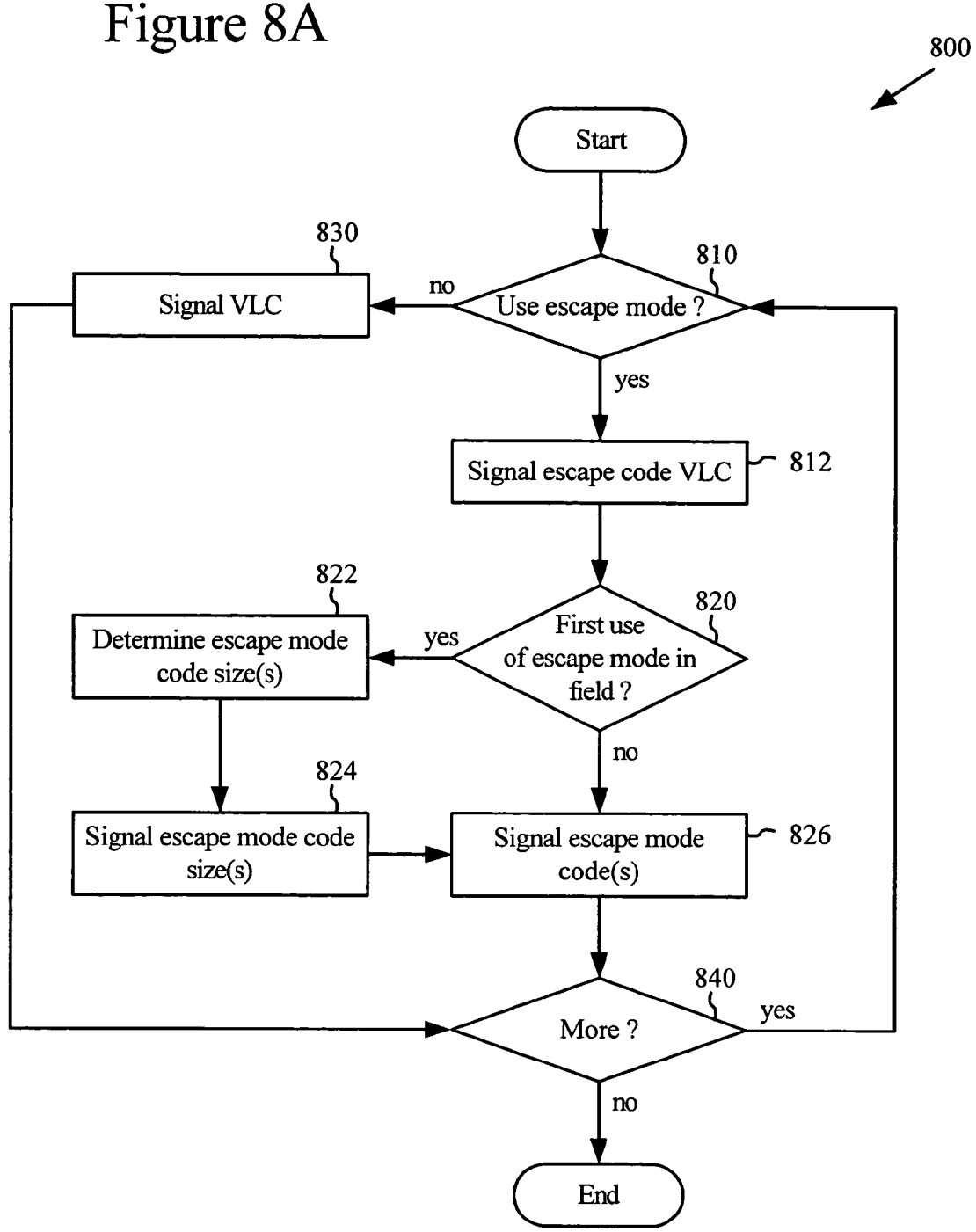
FIGS. 8A and 8B are flowcharts showing techniques for encoding and decoding, respectively, in an escape mode with code resizing on a per-field basis.

An encoder such as the encoder (600) of FIG. 6 encodes in an escape mode with code resizing on a per-field basis. For example, the encoder performs the technique (800) shown in FIG. 8A.

For information for a current unit (e.g., block, subblock, etc.) of a field, the encoder determines (810) whether or not to use the escape mode. For example, if a run/level/last triplet for transform coefficients of the unit is not directly represented in a VLC table, the encoder uses the escape mode. Otherwise (the "No" path out of decision 810), the encoder signals (830) the VLC from the VLC table for the information.

In the escape mode (the "Yes" path out of decision 810), the encoder signals (812) a VLC for an escape index of the VLC table and determines (820) whether or not this is the first use of the escape mode in the field. If not (the "No" path out of decision 820), the encoder signals (826) escape mode code(s) that have previously determined code size(s) for the field. For example, the escape mode code(s) are for run values and/or level values, or for another kind of information, for the current unit of the field.

If this is the first use of the escape mode in the field (the "Yes" path out of decision 820), the encoder determines (822) escape mode code size(s) for the field. For example, the encoder determines an escape mode run code size and/or an escape mode level code size for the field by looking ahead for the longest run and/or highest level absolute value in the field. Alternatively, the encoder determines escape mode code size(s) for other and/or additional kinds of information, or uses another technique to determine the escape mode code size(s). The encoder signals (824) the escape mode code size(s) using VLCs, FLCs, or another mechanism for the code size element(s). The encoder then signals (826) the escape mode code(s).

If there is any more information to encode for the current unit of the field (decision 840), the encoder continues at decision (810) for the next information. Otherwise, the technique (800) ends. For the next unit in the same field or a different field, the encoder repeats the technique (800).

Alternatively, the encoder performs another encoding technique that has an escape mode code resizing on a per-field basis. Or, the escape mode has code resizing on a per-slice or other sub-frame basis, separately or concurrently with resizing on a per-field basis.

Figure 8B:
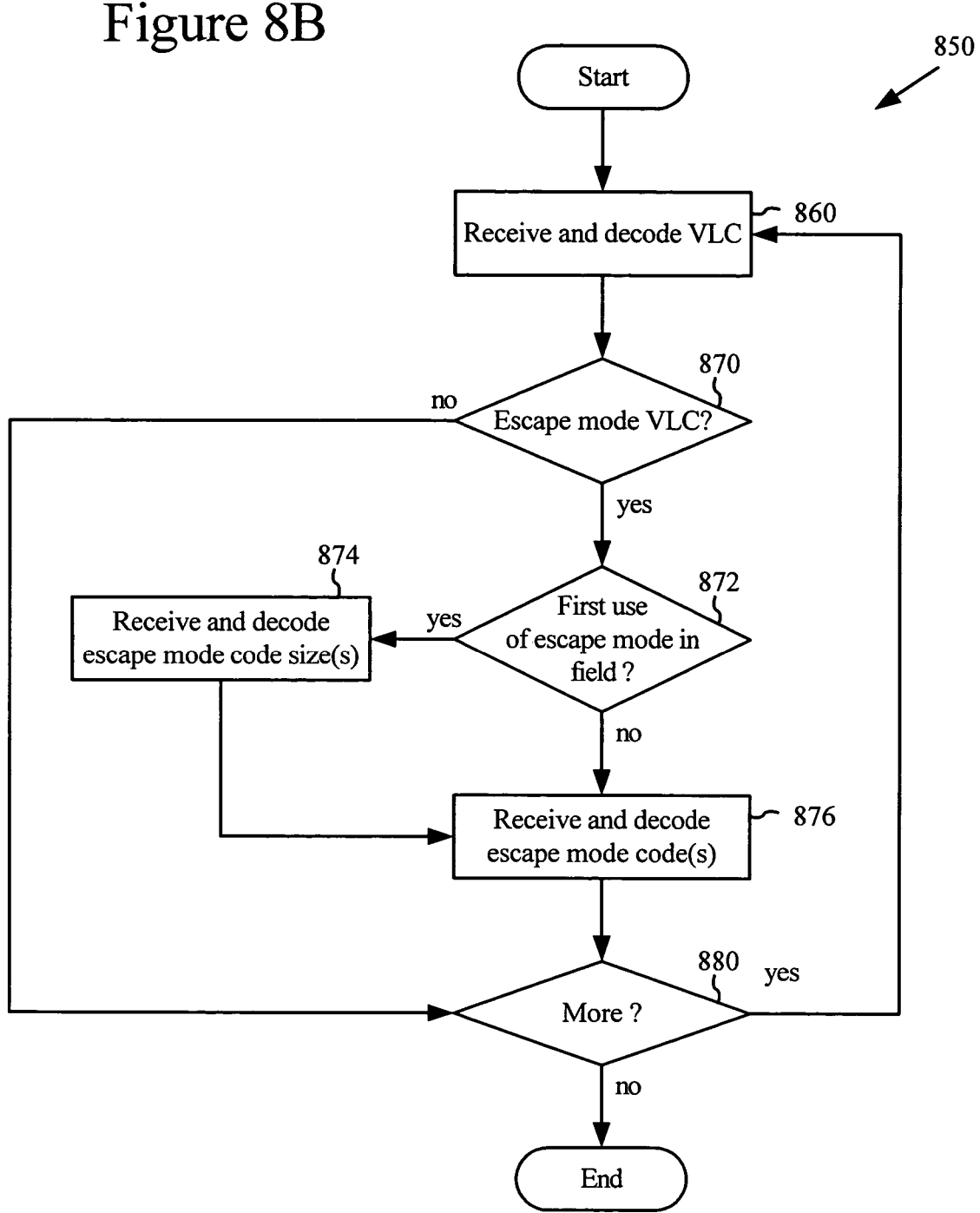

C. Decoding Techniques A decoder such as the decoder (700) of FIG. 7 decodes in an escape mode with code resizing on a per-field basis. For example, the decoder performs the technique (850) shown in FIG. 8B.

For information for a current unit (e.g., block, subblock, etc.) of a field, the decoder receives and decodes (860) a VLC. For example, the information is a run/level/last triplet for transform coefficients of the current unit or another kind of information for the current unit.

The decoder determines (870) whether or not the VLC indicates the escape mode should be used. For example, when a run/level/last triplet is not directly represented in a VLC table, the VLC represents an escape index of the VLC table. If the escape mode is not used (the "No" path out of decision 870), the decoder simply continues with the next VLC for the current unit, if there is one.

In the escape mode (the "Yes" path out of decision 870), the decoder determines (872) whether or not this is the first use of the escape mode in the field. If not (the "No" path out of decision 872), the decoder receives and decodes (876) escape mode code(s) that have previously determined code size(s) for the field. For example, the escape mode code(s) are for run values and/or level values, or for another kind of information, for the current unit of the field.

If this is the first use of the escape mode in the field (the "Yes" path out of decision 872), the decoder receives and decodes (874) escape mode code size(s) for the field. For example, the encoder decodes an escape mode run code size and/or an escape mode level code size for the field with a VLC table, FLC table, or other mechanism. Alternatively, the encoder decodes escape mode code size(s) for other and/or additional kinds of information, or uses another decoding technique to determine the code size(s). The decoder then receives and decodes (876) the escape mode code(s).

If there is any more information to decode for the current unit of the field (decision 880), the decoder receives and decodes (860) the VLC for the next information. Otherwise, the technique (850) ends. For the next unit in the same field or a different field, the decoder repeats the technique (860).

Alternatively, the decoder performs another decoding technique that has an escape mode code resizing on a per-field basis. Or, the escape mode has code resizing on a per-slice or other sub-frame basis, separately or concurrently with resizing on a per-field basis.

IV. Example Implementations

Example implementations of bitstream syntax, semantics, and decoding are now described, with an emphasis on block layer syntax, semantics, and decoding as they relate to resizing of escape mode codes in the example implementations.

A. Syntax and Semantics

In the example implementations, a compressed video sequence is made up of data structured into three main hierarchical layers: the picture layer, macroblock layer, and block layer. A sequence layer precedes the sequence, and entry point layers may be interspersed in the sequence. A slice layer may be present between the picture layer and macroblock layer.

1. Sequence Layer Syntax and Semantics

A sequence-level header contains sequence-level parameters used to decode the sequence of compressed pictures. In some profiles, the sequence-related metadata is communicated to the decoder by the transport layer or other means. In another profile (called the advanced profile), the sequence header syntax elements are part of the video bitstream.

Sequence level syntax elements may specify the profile used to encode the sequence and the encoding level in the profile. Another element may signal whether the source content is progressive or interlaced. (When the source content is progressive, the individual frames may still be coded using the progressive or interlace syntax.)

2. Entry-point Layer Syntax and Semantics

An entry-point header is present in the advanced profile. The entry point is used to signal a random access point within the bitstream. It is also used to signal changes in the coding control parameters.

3. Picture Layer Syntax and Semantics

In general, data for a picture consists of a picture header followed by data for the slice or macroblock layer. For example, a progressive frame consists of a frame header followed by data for the slice or macroblock layer. When interlaced fields are field coded, however, a frame header precedes picture layers for the respective fields.

The elements of the picture layer typically indicate picture type (e.g., I, P, or B) and, for interlaced content, whether the video frame is coded as one interlaced frame or two separate interlaced fields. For two interlaced fields, another element indicates whether the fields of the frame are, for example, two interlaced I-fields, one interlaced I-field and one interlaced P-field, two interlaced P-fields, two interlaced B-fields, one interlaced B-field and one interlaced BI-field, or two interlaced BI-fields. (A BI-field generally follows I-field syntax and semantics, but it is not used as a reference field, and it is typically coded at lower quality.)

A picture header may include elements that relate directly to block layer coding/decoding. For example, one optional element indicates the size of transform (e.g., 8×8, two 8×4, two 4×8, or four 4×4) used for inter-coded blocks of an inter-coded picture. One or more other elements may indicate decisions for coding/decoding coefficient data (e.g., which macroblocks in the picture use AC prediction for their blocks, which VLC table to use for AC coefficients in luma intra-coded blocks in an I-picture, which VLC table to use for AC coefficients in chroma intra-coded blocks in an I-picture, which VLC table to use for coefficients in intra-coded or inter-coded blocks in a P-picture, or which VLC table to use for DC coefficients in intra-coded blocks).

4. Slice Layer Syntax and Semantics

A slice represents one or more contiguous rows of macroblocks. The slice layer is present in the advanced profile and even then is optional. A slice begins at the first macroblock in a row and ends at the last macroblock in the same row or another row.

When a new slice begins, motion vector predictors, predictors for AC and DC coefficients, and predictors for quantization parameters are reset. In other words, with respect to prediction, the first row of macroblocks in the slice is treated as the first row of macroblocks in a picture. Further, when slices are used, information that is usually represented in a bitplane at picture layer is signaled in raw mode at macroblock layer, so that each macroblock carries its own local information. Also, when a new slice begins, code sizes are reset for codes in an escape mode for coefficients.

A slice address element indicates the row address of the first macroblock row in the slice. A picture header is optionally present in the slice header.

5. Macroblock Layer Syntax and Semantics

Data for a macroblock consists of a macroblock header followed by the block layer. A macroblock header may include elements that relate directly to block layer coding/decoding. For example, one optional element indicates the size of transform used at the block level for inter-coded blocks in an inter-coded macroblock and also may indicate which parts of a block have coefficient data signaled. Another element may indicate whether AC prediction is used for the blocks of a macroblock. A coded block pattern is an element that generally indicates which of the blocks of the macroblock have coefficient data signaled in the bitstream, but the precise semantics of the coded block pattern varies by picture and macroblock type.

6. Block Layer Syntax and Semantics

Figure 9A:
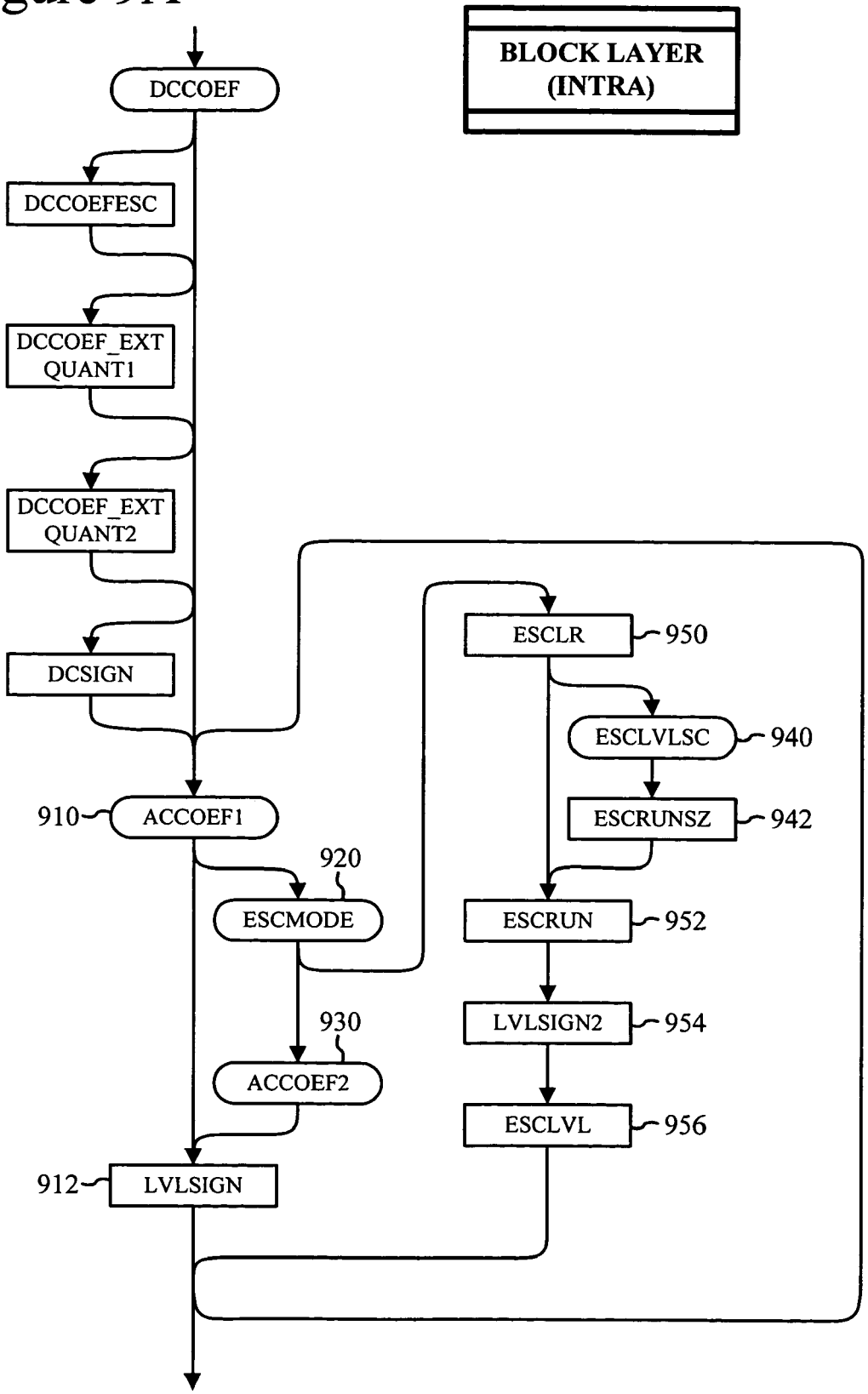
FIGS. 9A and 9B are syntax diagrams for block layers of a bitstream.
Figure 9B:
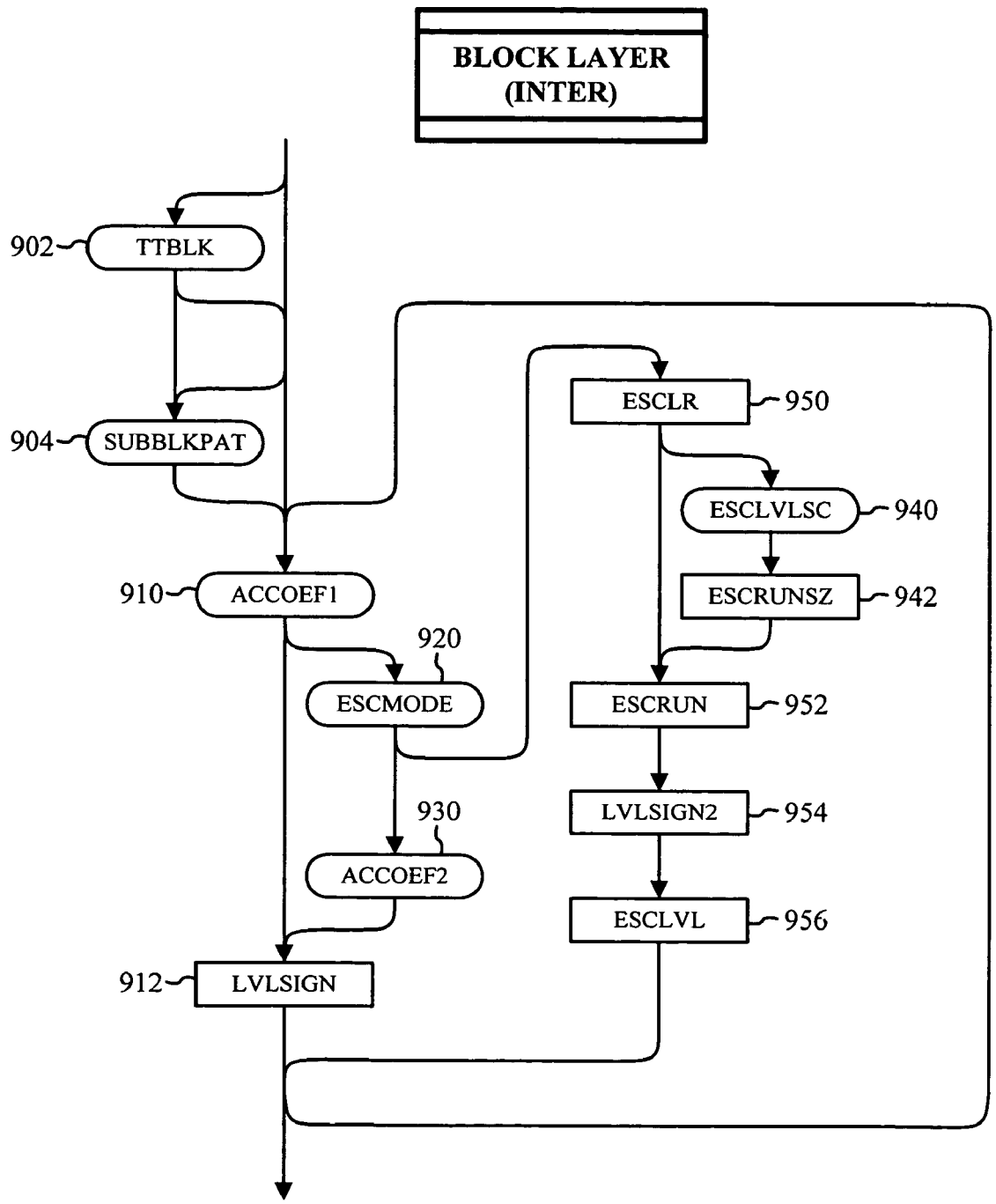

FIGS. 9A and 9B are syntax diagrams showing block-layer syntax elements for intra-coded blocks and inter-coded blocks, respectively.

For an inter-coded block, one optional element is the block level transform type TTBLK (902), which is present when the signaling level is block level for transform type (e.g., one 8×8, two 8×4, two 4×8, or four 4×4). For an 8×4 or 4×8 transform type, TTBLK (902) also signals the subblock pattern for the block (which subblocks have at least one non-zero coefficient). TTBLK (902) is not present for the first inter-coded block in each macroblock (since the transform type and subblock pattern for the first inter-coded block are signaled at the macroblock layer), but TTBLK (902) is present for each inter-coded block after the first when the signaling level is block level.

Also for an inter-coded block, the transform subblock pattern SUBBLKPAT (904) element is present for certain transform types and signaling levels. For 4×4 transform type, SUBBLKPAT (904) is always present and indicates which of the four 4×4 subblocks have at least one non-zero coefficient. For an 8×4 or 4×8 transform type, SUBBLKPAT (904) specifies which of the two sub-blocks have at least one non-zero coefficient and is present only if either a) the transform type is specified at the frame level, or b) if the transform type is specified at the macroblock level and the block is not the first inter-coded block in the macroblock.

For an intra-coded block, several elements signal DC coefficient information. These include a main VLC for the DC differential or coefficient value (decoded with one of two tables) and a DC coefficient sign. The elements potentially also include an escape mode code whose size depends on the quantization step size of the block or extension values for DC coefficients at low quantization step sizes.

As for AC coefficients, AC coefficient elements are generally present in both intra and inter-coded blocks. The transform AC coefficient 1 ACCOEF1 (910) element is a VLC that encodes a run, a level (for a non-zero coefficient) and a "last" flag value. When ACCOEF1 (910) decodes to the escape code, the presence of subsequent escape mode elements is signaled. One of three code tables is used to decode ACCOEF1 (910), where the table is signaled in the picture header.

The transform AC escape mode ESCMODE (920) element is a VLC present if ACCOEF1 (910) decodes to the escape code. ESCMODE (920) signals which of three escape modes are used to decode the AC coefficients. The table in FIG. 10A shows the VLC table used to encode and decode ESCMODE (920).

The transform AC coefficient 2 ACCOEF2 (930) element is a VLC present if ESCMODE (920) specifies escape mode 1 or 2. Use of ACCOEF2 varies depending on whether escape mode 1 or 2 is signaled. One of three code tables is used to encode and decode ACCOEF2 (930), where the table is signaled in the picture header.

The transform AC level sign LVLSIGN (912) element is present unless ESCMODE (920) specifies escape mode 3. LVLSIGN (912) is a one-bit value that specifies the sign of the AC level. If LVLSIGN=0, then the level is positive. If LVLSIGN=1, then the level is negative.

The ESCLR (950), ESCRUN (952), LVLSIGN2 (954), and ESCLVL (956) elements are present if escape mode 3 is signaled. In certain cases, the ESCLVLSZ (940) and ESCRUNSZ (942) elements are present for a block (e.g., for the first escape mode 3-coded coefficients in a frame, or the first escape mode 3-coded coefficients in a field, or the first escape mode 3-coded coefficients in a slice)

The escape mode 3 last run ESCLR (950) element is a one-bit value that specifies whether the escape mode 3-coded level is for the last non-zero coefficient in the block. If ESCLR=1, then it is the last non-zero coefficient in the block. If ESCLR=0, then it is not the last non-zero coefficient in the block.

The escape mode 3 run ESCRUN (952) element directly encodes the run value for rm/level/last information signaled in escape mode 3. The size of ESCRUN (952) is fixed throughout the frame (or field, or slice), where the size of the ESCRUN (952) element is set with the ESCRUNSZ (942) element upon the first occurrence of escape mode 3 coding in the frame (or field, or slice). For example, if the run code size is 4 bits and the binary value of the run code is 0101, the run is decoded as 5.

The escape mode 3 level ESCLVL (956) element directly encodes the level value for run/level/last information signaled in escape mode 3. The size of ESCLVL (956) is fixed throughout the frame (or field, or slice), where the size of the ESCLVL (956) element is set with the ESCLVLSZ (940) element upon the first occurrence of escape mode 3 coding in the frame (or field, or slice). For example, if the level code size is 3 bits and the binary value of the level code is 110, the level is decoded as 6.

The escape mode 3 level sign LVLSGN2 (954) element is a one-bit value that specifies the sign of the decoded level value signaled in escape mode 3. If LVLSGN2=0, then the level is positive. If LVLSGN2=1, then the level is negative.

The escape mode 3 level size ESCLVLSZ (940) element is present if ESCMODE (920) specifies escape mode 3 and this is the first time escape mode 3 has been signaled within the current frame (or field, or slice). In other words, for a progressive or frame-coded interlaced frame (without slices), ESCLVLSZ (940) is signaled with the first instance of escape mode 3 coding/decoding within the frame, but not with subsequent instances of escape mode 3 coding/decoding within the same frame. For an interlaced field (without slices), the first instance of escape mode 3 coding/decoding within the field has ESCLVLSZ (940), but subsequent instances of escape mode 3 coding/decoding within the same field do not have ESCLVLSZ (940). When slices are used, ESCLVLSZ (940) is signaled for the first instance of escape mode 3 coding/decoding within a slice, but not for subsequent instances of escape mode 3 coding/decoding within the same slice.

ESCLVLSZ (940) is used to specify the codeword size for the mode 3 escape-coded level values for an entire frame (or field, or slice). Two different VLC tables are used to encode/decode ESCLVLSZ (940), depending on the value of PQUANT (a picture level quantization factor) and other information. A "conservative" table is used when PQUANT is between 1 and 7, both values inclusive. An "efficient" table is used when PQUANT is 8 and higher. The conservative table covers the widest range of possible size values, whereas the efficient table covers a limited subset and is therefore used when the values may be guaranteed to be within the available range. When DQUANT (differential quantization) is used within a frame, the conservative table is used regardless of PQUANT. FIG. 10B shows the conservative code table, and FIG. 10C shows the efficient code table.

The escape mode 3 run size ESCRUNSZ (942) element is present if ESCMODE (920) specifies escape mode 3 and this is the first time escape mode 3 has been signaled within the current frame (or field, or slice). In other words, for a progressive or frame-coded interlaced frame (without slices), ESCRUNSZ (942) is signaled with the first instance of escape mode 3 coding/decoding within the frame, but not with subsequent instances of escape mode 3 coding/decoding within the same frame. For an interlaced field (without slices), the first instance of escape mode 3 coding/decoding within the field has ESCRUNSZ (942), but subsequent instances of escape mode 3 coding/decoding within the same field do not have ESCRUNSZ (942). When slices are used, ESCRUNSZ (942) is signaled for the first instance of escape mode 3 coding/decoding within a slice, but not for subsequent instances of escape mode 3 coding/decoding within the same slice.

ESCRUNSZ (942) is used to specify the codeword size for the mode 3 escape-coded run values for an entire frame (or field, or slice). FIG. 10D shows a code table for encoding/decoding ESCRUNSZ (942).

B. Block-Layer Decoding

Block layer decoding processes depend on the type of a block (e.g., intra-coded or inter-coded) and the coding/decoding options (e.g., AC prediction) used for the block. In general, I-pictures include intra-coded blocks, and P- and B-pictures include inter-coded blocks and/or intra-coded blocks. In a few cases, certain macroblocks (e.g., 4MV macroblocks in interlaced P-fields) may not include intra-coded blocks.

For an intra-coded block, the DC and AC transform coefficients are coded and decoded using separate techniques. The DC coefficient is coded differentially. The AC coefficients of the left column (or top row) are optionally coded differentially and then coded with 3D variable length coding. For an inter-coded block, the DC and AC transform coefficients are coded and decoded together.

1. DC Coefficients for Intra-coded Blocks of I-Pictures

The DC coefficient for an intra-coded block is coded differentially with respect to an already coded/decoded DC coefficient of a neighboring block. A decoder decodes a DC differential, determines a DC predictor, and combines the DC predictor and DC differential to reconstruct the quantized value of the DC coefficient. The quantized DC coefficient is then de-quantized.

2. AC Coefficients for Intra-coded Blocks of I-Pictures

The first step in reconstructing the AC coefficients for an intra-coded block is to decode the run/level/last triplets that represent the locations and quantized levels for each non-zero AC coefficient. A set of tables and constants (termed an AC coding set) are used to decode the run, level, and last values.

The pseudocode in FIGS. 11A and 11B is for decoding a run/level/last triplet for AC coefficients using an AC coding set. As for tables in the AC coding set, CodeTable is a selected VLC table used to decode ACCOEF1 (910) (and possibly ACCOEF2 (930)). RunTable is a table of run values indexed by a value decoded from ACCOEF1 (910) or ACCOEF2 (930). LevelTable is a table of level values indexed by a value decoded from ACCOEF1 (910) or ACCOEF2 (930). NotLastDeltaRunTable and LastDeltaRunTable are tables of delta run values indexed by a level value, and are used in escape mode 2. NotLastDeltaLevelTable and LastDeltaLevelTable are tables of delta level values indexed by a run value, and are used in escape mode 1.

The VLC table for ACCOEF1 (910) or ACCOEF2 (930) associates VLCs with index values from 0 to N, and a decoded index value is used to obtain the run and level values from RunTable and LevelTable, respectively. The constant StartIndexOfLast separates index values where the last flag is 0 from index values where the last flag is 1. The first StartIndexOfLast-1 index values in the VLC table correspond to run/level pairs that are not the last pair in the block. The next StartIndexOfLast to N−1 index values correspond to run/level pairs that are the last pair in the block. The last index value in the VLC table, the $N^{th}$ index value, is the escape code index.

The binary value first_mode3 is used in escape mode 3, according to which values are signaled with codes of a signaled size for a frame (or field, or slice). The flag first_mode3 is set to 1 at the beginning of a frame (or field, or slice). It is set to zero when escape mode 3 is used for the first time in the frame (or field, or slice).

To improve compression efficiency, there are eight AC coding sets (tables, constants, etc.). The eight sets are divided into two groups of four. For luma intra-coded blocks, one of four coding sets is used. For chroma intra-coded blocks, one of a different four coding sets is used. The index for a AC coding set is signaled by a syntax element the picture header. The tables in FIGS. 12A and 12B show how different index values from the I-picture syntax elements correspond to different AC coding sets. A given index signals a table (and AC coding set), depending on the value of PQINDEX (a picture level quantizer-related element). A first picture-level element signals the coding set index for luma blocks, and a second picture-level element signals the coding set index for chroma blocks.

The decoding shown in FIGS. 11A and 11B repeats for run/level/last triplets until last_flag=1, which indicates the last non-zero coefficient in the block has been decoded. In particular, the run/level pairs are used to form a one-dimensional array of 63 elements (for an 8×8 block) as shown in the pseudocode of FIG. 13. In pseudocode of FIG. 13, the routine in FIGS. 11A and 111B is called iteratively until it returns last_flag=1.

The values in the one-dimensional array are zigzag scanned into a two-dimensional, 8×8 array. The DC coefficient is in position 0 (top left corner). A zigzag mapping pattern is used to scan out the 63 AC coefficients from the one-dimensional array to the two-dimensional array. When AC prediction is used, the top row or left column of AC coefficients in the block are differential values, so they are combined with predicted AC coefficient values. The quantized AC coefficients are de-quantized. The transform coefficients are then processed by an inverse frequency transform and, possibly, in other stages to complete reconstruction.

3. Coefficients for Intra-coded Blocks of P-Pictures

As to escape mode decoding of runs and levels for coefficients, decoding of intra-code blocks in P-pictures is very similar to decoding of intra-code blocks in I-pictures. An index for an AC coding set used to code/decode coefficients is again signaled with a picture-level element. A single index and coding set are used for intra-coded blocks in a P-picture, for both luma blocks and chroma blocks (as opposed to two indices and corresponding AC coding sets for intra-coded blocks in I-pictures). The tables in FIGS. 12C and 12D show how different indices from the P-picture syntax element correspond to different AC coding sets.

4. Coefficients for Inter-coded Blocks

If variable-sized transform coding is enabled, an 8×8 inter-coded block may be transformed using one 8×8 transform, or divided vertically and transformed with two 8×4 transforms, or divided horizontally and transformed with two 4×8 transforms, or divided into four quadrants and transformed with four 4×4 transforms. The transform type is signaled at the picture level, macroblock level or block level. If variable-sized transform coding is not enabled, an 8×8 transform is used for all inter-coded blocks. If the transform type is 8×4, 4×8 or 4×4, a subblock pattern is signaled to indicate which of the subblocks of the inter-coded block have non-zero coefficients. The subblock pattern is signaled at macroblock level or block level. If the subblock pattern indicates no non-zero coefficients are present for a subblock, then no other information for that subblock is present in the bitstream.

The process of decoding run, level and last information for coefficients of a block or subblock is nearly identical to the process of decoding AC coefficients in intra-coded blocks (as in FIGS. 11A and 11B), but there are a few notable differences. First, the DC coefficient is not differentially coded for an inter-coded block. The DC and AC coefficients are decoded using the same process. Second, unlike intra-coded blocks in I-pictures, the luma and chroma inter-coded blocks all use the same coding set. The correspondence between a coding set index value and a coding set again depends on PQINDEX (see FIGS. 12E and 12F).

The overall process for decoding run/level pairs is basically the same as for intra-coded blocks of I-pictures (as in FIG. 13). One difference, however, is that all coefficients are run/level/last encoded, not just the AC coefficients. For an 8×8 transform, decoding the run/level/last triplets produces a 64-element array. Another difference is due to variable-size transforms. Decoding run/level/last triplets produces a 16-element array in the case of a 4×4 transform, and produces a 32-element array in the case of an 8×4 or 4×8 transform.

The one-dimensional array of quantized coefficients is zigzag scanned into a two-dimensional array. The reconstructed quantized coefficients are de-quantized. The transform coefficients in the two-dimensional array are processed by an inverse frequency transform and, possibly, in other stages (e.g., combination with a motion-compensated prediction) to complete reconstruction.

V. Alternatives

Various alternatives are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. The various techniques and tools can be used in combination or independently.

In various embodiments, an encoder and decoder use flags and/or signals in a bitstream. While specific flags and signals are described, it should be understood that this manner of description encompasses different conventions (e.g., 0's rather than 1's) for the flags and signals.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
   receiving encoded information for transform coefficients of blocks; and decoding the encoded information, including decoding at least some of the encoded information in an escape mode for which plural codes have sizes that are signaled on a sub-frame basis, wherein the sizes are signaled for a first use of the escape mode in a sub-frame unit but not for a second or further subsequent use of the escape mode in the sub-frame unit, wherein the sizes comprise a run code size and a level code size, and wherein the decoding includes:

for the first use of the escape mode in the sub-frame unit but not for the second or further subsequent use of the escape mode in the sub-frame unit,
decoding the run code size from a run code size value signaled at block level, and
decoding the level code size from a level code size value signaled at block level, for each of the first use and the second or further subsequent use of the escape mode in the sub-frame unit,
decoding a run value from a run code of the plural codes, the run code having the run code size, and
decoding a level value from a level code of the plural codes, the level code having the level code size.

2. The method of claim 1 wherein the sub-frame unit is a field or slice in a frame.

3. The method of claim 2, wherein the decoding further includes:
for a first use of the escape mode in a second field or slice in the frame but not for a second or further subsequent use of the escape mode in the second field or slice, decoding a second run code size and a second level code size from a second run code size value and a second signaled level code size value, respectively; and
for each of the first use and the second or further subsequent use of the escape mode in the second field or slice, decoding a run value and a level value from codes that have the run code size and level code size, respectively, for the second field or slice.

4. The method of claim 1 wherein the decoding includes run/level/last decoding, and wherein, in the escape mode, a run/level/last triplet is represented as an escape code, a last flag, the run code, the level code, and a level sign value.

5. The method of claim 1 wherein the sub-frame unit is an interlaced field.

6. The method of claim 1 wherein the sub-frame unit is a slice.

7. The method of claim 1 wherein the escape mode is one of multiple available escape modes.

8. A method comprising:
determining information for transform coefficients of blocks; and
encoding the information, including encoding at least some of the information in an escape mode for which plural codes have sizes that are signaled on a sub-frame basis, wherein the sizes are signaled for a first use of the escape mode in a sub-frame unit but not for a second or further subsequent use of the escape mode in the sub-frame unit, wherein the sizes comprise a run code size and a level code size, and wherein the encoding includes:
for the first use of the escape mode in the sub-frame unit but not for the second or further subsequent use of the escape mode in the sub-frame unit;
signaling the run code size at a block level of the sub-frame unit; and
signaling the level code size at the block level of the sub-frame unit;
for each of the first use and the second or further subsequent use of the escape code in the sub-frame unit,
encoding a run value with a run code, of the plural codes, that has the signaled run code size for the sub-frame unit; and
encoding a level value with a level code, of the plural codes, that has the signaled level code size for the sub-frame unit.

9. The method of claim 8, wherein the sub-frame unit is for a field or slice in a frame, and wherein the encoding further includes:
for a first use of the escape mode in a second field or slice in the frame but not for a second or further subsequent use of the escape mode in the second field or slice, signaling a run code size and a level code size for the second field or slice; and
for each of the first use and the second or further subsequent use of the escape mode in the second field or slice, encoding a run value and a level value with codes that have the signaled run code size and level code size, respectively, for the second field or slice.

10. The method of claim 8 wherein the encoding includes run/level/last encoding, and wherein, in the escape mode, a run/level/last triplet is represented as an escape code, a last flag, the run code, the level code, and a level sign value.

11. The method of claim 8 wherein the sub-frame unit is an interlaced field.

12. The method of claim 8 wherein the sub-frame unit is a slice.

13. The method of claim 8 wherein the escape mode is one of multiple available escape modes.

14. A decoder comprising:
means for decoding encoded runs and levels, including decoding at least some of the encoded runs and levels in an escape mode for which plural codes have sizes that are signaled on an interlaced field basis or slice basis within a video frame, wherein the sizes are signaled for a first use of the escape mode in the interlaced field or slice but not for a second or further subsequent use of the escape mode in the interlaced field or slice, wherein the sizes comprise a run code size and a level code size, and wherein the decoding includes:
for the first use of the escape mode in the interlaced field or slice but not for the second or further subsequent use of the escape mode in the interlaced field or slice,
decoding the run code size from a run code size value signaled at block level of the interlaced field or slice, and
decoding the level code size from a level code size value signaled at block level of the interlaced field or slice;
for each of the first use and the second or further subsequent use of the escape mode in the interlaced field or slice,
decoding a run value from a run code of the plural codes, the run code having the signaled run code size for the interlaced field or slice, and
decoding a level value from a level code of the plural codes, the level code having the signaled level code size for the interlaced field or slice;
means for performing inverse quantization; and
means for performing inverse frequency transforms.

15. The decoder of claim 14 wherein the signaled run code size and the signaled level code size are signaled for a first interlaced field or slice in the video frame, and wherein a second run code size and second level code size are signaled for a second interlaced field or slice in the video frame.

16. The decoder of claim 14 further comprising:

means for performing data transforms.

17. The method of claim 1 further comprising:

receiving one or more quantization parameters that indicate how to inverse quantize the transform coefficients of the blocks, wherein the signaled sizes are signaled separately from the one or more quantization parameters.

18. The method of claim 1 wherein the decoding includes:

setting a first flag at the beginning of the sub-frame unit, wherein the set first flag indicates that the escape mode has not yet been used in the sub-frame unit;

when the escape mode is used in the sub-frame unit, clearing the first flag, wherein the cleared first flag indicates that the escape mode has been used in the sub-frame unit, and wherein the cleared first flag further indicates that sizes will not be signaled for the one or more subsequent uses of the escape mode in the sub-frame unit.

19. The method of claim 8 further comprising:

encoding one or more quantization parameters that indicate how to inverse quantize the transform coefficients of the blocks, wherein the signaled sizes are signaled separately from the one or more quantization parameters.

* * * * *